United States Patent
Stajner et al.

(10) Patent No.: US 11,435,202 B2
(45) Date of Patent: Sep. 6, 2022

(54) TRAJECTORY SAMPLING USING SPATIAL FAMILIARITY

(71) Applicant: HERE Global B.V., Eindhoven (NL)

(72) Inventors: Tadej Stajner, Berlin (DE); Muhammad Kashif Kaleem, Berlin (DE); Akos Nagy, Berlin (DE); Olivier Dousse, Berlin (DE)

(73) Assignee: HERE Global B.V., Eindhoven (NL)

( * ) Notice: Subject to any disclaimer, the term of this patent is extended or adjusted under 35 U.S.C. 154(b) by 255 days.

(21) Appl. No.: 16/430,755

(22) Filed: Jun. 4, 2019

(65) Prior Publication Data
US 2020/0386569 A1    Dec. 10, 2020

(51) Int. Cl.
*G01C 21/36*    (2006.01)
*G01C 21/32*    (2006.01)
(Continued)

(52) U.S. Cl.
CPC ......... *G01C 21/3641* (2013.01); *G01C 21/32* (2013.01); *G01C 21/3492* (2013.01); *G08G 1/0967* (2013.01)

(58) Field of Classification Search
CPC ................ G01C 21/3641; G01C 21/32; G01C 21/3492; G08G 1/0967
See application file for complete search history.

(56) References Cited

U.S. PATENT DOCUMENTS

| | | | |
|---|---|---|---|
| 9,417,069 B2 | 8/2016 | Gupta et al. | |
| 2013/0030690 A1* | 1/2013 | Witmer | G01C 21/32 701/409 |
| 2015/0347698 A1* | 12/2015 | Soni | G16H 50/30 706/11 |

(Continued)

FOREIGN PATENT DOCUMENTS

| | | | |
|---|---|---|---|
| CN | 104677363 A | 6/2015 | |
| CN | 105387863 A | 3/2016 | |
| EP | 3109842 A1 * | 12/2016 | ......... G01C 21/3492 |
| WO | WO-2017/124331 A1 | 7/2017 | |

OTHER PUBLICATIONS

Dixon, Chris J. et al. *Sampling Methods For Geographical Research*, Norwich: Geo Abstracts, (1977), (25 pages).
Panagiotakis, Costas et al. *Segmentation and Sampling Of Moving Object Trajectories Based On Representativeness*, IEEE Transactions on Knowledge and Data Engineering, vol. 24, No. 7, pp. 1-17, Jul. 2012. DOI: 10.1109/TKDE.2011.39.

(Continued)

*Primary Examiner* — Faris S Almatrahi
*Assistant Examiner* — Sahar Motazedi
(74) *Attorney, Agent, or Firm* — Alston & Bird LLP

(57) ABSTRACT

A plurality of instances of probe data are received and used to generate a plurality of probe trajectories. A set of selected probe trajectories is defined using spatial familiarity sampling wherein a familiarity score is determined for each instance of probe data of a probe trajectory based on a familiarity model corresponding to already selected probe trajectories. A least familiar familiarity score for a probe trajectory is identified from the familiarity scores determined for the probe trajectory and a determination of whether the probe trajectory is included in the set of selected probe trajectories is performed based on the least familiar familiarity score for the probe trajectory. Only the probe trajectories of the set of selected probe trajectories are map-matched. The map-matched probe trajectories are then used to generate traffic and/or map information/data which is provided to consumer apparatuses for use in performing navigation functions, for example.

20 Claims, 8 Drawing Sheets

(51) Int. Cl.
*G01C 21/34* (2006.01)
*G08G 1/0967* (2006.01)

(56) References Cited

U.S. PATENT DOCUMENTS

2019/0170519 A1* 6/2019 Anwar ............... G01S 19/14
2020/0011684 A1* 1/2020 McErlain, II ......... G01C 21/20
2021/0020034 A1* 1/2021 Lorenz ............... G08G 1/0112

OTHER PUBLICATIONS

Hall, Peter et al. *On The Accuracy Of Binned Kernel Density Estimators*, Journal of Multivariate Analysis, vol. 56, No. 2, (1996), pp. 165-184. DOI: 10.1006/jmva.1996.0009.

Potamias et al., *Sampling Trajectory Streams With Spatiotemporal Criteria*, 18th International Conference on Scientific and Statistical Database Management (SSDBM'06), Vienna, (2006), 10 pages. DOI: 10.1109/SSDBM.2006.45.

El Mahrsi et al., *Spatiotemporal Sampling For Trajectory Streams*, Proceedings Of The 2010 ACM Symposium On Applied Copmputing, Sierre, Switzerland, Mar. 22-26, 2010, pp. 1627-1628. DOI: 10.1145/1774088.1774438.

Ekpenyong et al., *Updating of Road Network Databases: Spatio-Temporal Trajectory Grouping Using Snap-Drift Neural Network*, In: Proc. Int Conf On Engineering Applications of Neural Networks, EANN 2007, 11 pages.

Cai, et al., *Using Kernel Density Estimation To Assess The Spatial Pattern Of Road Density And Its Impact On Landscape Fragmentation*, International Journal of Information Science, vol. 27, Issue 2, Feb. 2013, pp. 222-230. DOI: 10.1080/13658816.2012.663918.

* cited by examiner

TRAJECTORY SAMPLING USING SPATIAL FAMILIARITY

TECHNOLOGICAL FIELD

An example embodiment relates generally to processing probe information/data to generate and/or determine traffic and/or map information/data. An example embodiment relates generally to the determination of which probe trajectories of probe information/data to process to generate and/or determine traffic and/or map information/data.

BACKGROUND

Traffic and/or map information/data corresponding to a road network are often determined based on the processing of probe information/data captured by probe vehicles as they traverse portions of a road network. It can be computationally very expensive to process all of the probe information/data. Additionally, a significant portion of the probe information/data corresponds to a disproportionately small percentage of the road network. For example, a significant portion of the probe information/data corresponds to the most heavily traveled segments of the road network. Meanwhile, the probe information/data provides less coverage of less heavily traveled segments of the road network. Thus, reducing computational expense of processing the probe information/data by merely reducing the amount of probe information/data processed via random selection results in the coverage of the traffic and/or map information/data generated and/or determined from the processing of the randomly reduced to be diminished. In particular, the coverage of less heavily traveled segments of the road network is diminished.

BRIEF SUMMARY OF SOME EXAMPLE EMBODIMENTS

Various embodiments provide a technical solution to the technical problem of reducing the computational expense of generating and/or determining traffic and/or map information/data by processing probe information/data. Additionally, various embodiments provide a technical improvement to the increasing the resiliency of the traffic and/or map information/data determined by the processing of the probe information/data against deanonymization attacks.

Various embodiments provide methods, apparatus, systems, computer program products and/or the like configured to generating and/or determining traffic and/or map information/data based on probe information/data. For example, an analysis apparatus receives a plurality of instances of probe information/data from a plurality of probe apparatuses. The analysis apparatus links two or more instances of probe information/data (e.g., based on a session identifier associated with and/or provided as part of each instance of the two or more instances of probe information/data and/or the like) into a time-ordered sequence to generate a probe trajectory. A plurality of the generated probe trajectories are selected for analysis based on the desired coverage of the resulting traffic and/or map information/data and/or the computational resources available and/or slated for use in the generating and/or determining of the traffic and/or map information/data from the probe information/data. The selected probe trajectories may then be map-matched and analyzed to generate and/or determine the traffic and/or map information/data. Once the traffic and/or map information/data is determined, it may be provided to one or more consumer apparatuses. In various embodiments, a consumer apparatus may use the traffic and/or map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like.

In various embodiments, the selection of the probe trajectories is performed based on the spatial familiarity of at least one instance of probe information/data of a probe trajectory. In an example embodiment, the selection of a probe trajectory is based on the least spatially familiar instance of probe information/data of the two or more instance of probe information/data that were linked to generate the probe trajectory. For example, a spatial familiarity score may be determined for each instance of probe information/data linked to generate the probe trajectory. The least familiar familiarity of the probe trajectory, which is the familiarity score associated with the instance of probe information/data of the probe trajectory having the familiarity score indicating the least amount of spatial familiarity, may then be used to determine whether the probe trajectory is to be selected or not. In an example embodiment, the determination of whether or not the probe trajectory is to be selected or not may be based on the comparison of the least familiar familiarity score of the probe trajectory with a selection threshold requirement. In an example embodiment, the determination of whether or not the probe trajectory is to be selected or not may be a probabilistic selection of probe trajectories, where probe trajectories having least familiar familiarity scores that indicate a lower level of familiarity are more likely to be selected compared to probe trajectories having least familiar familiarity scores that indicate a higher level of familiarity.

In various embodiments, each instance of probe information/data comprises location information/data indicating a location of a corresponding probe apparatus when the instance of probe information/data was captured and a timestamp indicating the date and/or time at which the instance of probe information/data was captured. In an example embodiment, the probe informatind/data comprises a session identifier configured to enable the analysis apparatus to link instances of probe information/data generated by the same probe apparatus and/or the same probe apparatus during a single trip and/or ignition cycle of a corresponding probe vehicle. In various embodiments, the instance of probe information/data may further comprise speed information/data indicating a travel speed of the probe apparatus, information/data captured by one or more sensors onboard the probe vehicle, a result of analysis of information/data captured by one or more sensors onboard the probe vehicle, and/or the like.

In various embodiments, the spatial familiarity score for an instance of probe information/data is determined based on a spatial familiarity model. For example, the probe trajectories may be selected in series, such that the spatial familiarity (e.g., similarity) between a particular probe trajectory (e.g., the instances of probe information/data thereof) being considered for selection may be determined based on the already selected probe trajectories. In an example embodiment, the spatial familiarity of an instance of probe information/data may be determined by comparing the location information/data of the instance of probe information/data to a familiarity and/or spatial coverage model corresponding to the already/previously selected probe trajectories. In an example embodiment, the familiarity and/or spatial coverage model is a tree data structure (e.g., a K-D tree). In an example embodiment, the familiarity and/or spatial coverage model is a grid model. For example, the location information/data of each already/previously selected probe trajectory is binned based on its proximity to a grid point. For example, as described above, the sampling of the space provided by the plurality of instances of probe information/data is non-uniform. This non-uniformity may be taken advantage of by binning the kernel density estimator. In an example embodiment, a linear binning approximation is used for kernel density estimation such that data points are redistributed along a fixed-size grid, so that the grid only stores a weight value for every grid point, where the weight is inversely proportional to how close a data point fell to that grid point. In various embodiments, the pairwise distances between the location information/data of an instance of probe information/data and the location information/data of each already/previously selected probe trajectory or grid point is transformed into a familiarity score using a kernel function. For example, the kernel function may be configured to provide spatial smoothing when estimating familiarity, in an example embodiment.

In various embodiments, only the selected probe trajectories are processed for use in generating and/or determining the traffic and/or map information/data. For example, the selected probe trajectories may be map-matched to a traversable map element (TME). In various embodiments, a TME may be a link or segment of road network (e.g., defined by an intersection and/or node located at each end of the link or road segment) or a traversable lane of a link or road segment of the road network. For example, each instance of probe information/data of a probe trajectory may be map-matched to a TME of a digital map that represents a road network. In an example embodiment, the probe trajectory is segmented into probe trajectory segments, wherein each probe trajectory segment includes the instances of probe information/data of the probe trajectory that were map-matched to the same TME. For example, a first probe trajectory segment includes the instances of probe information/data of the probe trajectory that were map-matched to a first TME. The probe trajectory segments may be binned and/or grouped based on the corresponding map-matched TME, and then each bin and/or group of probe trajectory segments may be analyzed to generate and/or determine traffic and/or map information/data for the corresponding TME. The traffic and/or map information/data corresponding to a TME may be provided by itself, packaged with traffic and/or map information/data corresponding to other TMEs, and/or packaged as a layer, for example, of a digital map and/or a digital map tile (e.g., a pre-defined portion of the digital map that represents a portion of the road network that corresponds to the TME to which the traffic and/or map information/data corresponds). As indicated above, the analysis apparatus may provide the traffic and/or map information/data (possibly as part of a digital map and/or digital map tile) such that one or more consumer apparatuses receive the traffic and/or map information/data such that at least one of the one or more consumer apparatuses may use the traffic and/or map information/data for performing one or more navigation functions.

In various embodiments, the selection process used to select the probe trajectories provides an improvement to the art. For example, the selection process ensures that an application specific appropriate level of coverage of the road network is provided by the generated and/or determined traffic and/or map information/data while reducing the computational resources required for generating and/or determining the traffic and/or map information/data and increasing the resiliency of the traffic and/or map information/data to deanonymization attacks.

In an example embodiment, a plurality of instances of probe data are received by an analysis apparatus. Each instance of probe data comprises location data indicating a location of a probe apparatus when the instance of probe data was generated and a timestamp indicating the date and/or time when the instance of probe data was generated. The analysis apparatus comprises a processor, memory, and a communication interface. The analysis apparatus generates a plurality of probe trajectories from the plurality of instances of probe data. A probe trajectory of the plurality of probe trajectories is generated by linking two or more instances of probe data corresponding to a same trip and time ordering the two or more instances of probe data based on the timestamp of each of the two or more instances of probe data. The analysis apparatus defines a set of selected probe trajectories. The set of selected probe trajectories is defined by determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and when it is determined to select the first probe trajectory, adding the first probe trajectory to the set of selected probe trajectories. The analysis apparatus generated traffic and/or map data based on the set of selected probe trajectories. The analysis apparatus provides the traffic and/or map data such that a consumer apparatus receives the traffic and/or map data.

According to a first aspect of the present invention, a method is provided. In an example embodiment, the method comprises receiving, by an analysis apparatus, a plurality of instances of probe data. Each instance of probe data comprising location data indicating a location of a probe apparatus when the instance of probe data was generated and a timestamp indicating the date and/or time when the instance of probe data was generated. The analysis apparatus comprises a processor, memory, and a communication interface. The method further comprises generating, by the analysis apparatus, a plurality of probe trajectories from the plurality of instances of probe data. A probe trajectory of the plurality of probe trajectories is generated by linking two or more instances of probe data corresponding to a same trip and time ordering the two or more instances of probe data based on the timestamp of each of the two or more instances of probe data. The method further comprises defining, by the analysis apparatus, a set of selected probe trajectories. Defining the set of selected probe trajectories comprises determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and when it is determined to select the first probe trajectory, adding the first probe trajectory to the set of selected probe trajectories. The method further comprises generating, by the analysis apparatus, traffic and/or map data based on the set of selected probe trajectories; and providing, by the analysis apparatus, the traffic and/or map data such that a consumer apparatus receives the traffic and/or map data.

In an example embodiment, the consumer apparatus is configured to use at least a portion of the traffic and/or map data to perform a navigation function. In an example embodiment, the familiarity model is a grid model. In an example embodiment, the traffic and/or map data is provided as part of a digital map or a tile of a digital map. In an example embodiment, the traffic and/or map data is generated by map-matching the selected probe trajectories of the set of selected probe trajectories. In an example embodiment, the traffic and/or map data comprises volume related traffic and/or map data which is determined by applying a correction factor that is determined based on a ratio of a density function of the plurality of instances of probe data to a density function of instances of probe data of selected probe trajectories of the set of selected probe trajectories. In an example embodiment, determining the least familiar familiarity score for the first probe trajectory comprises determining two or more familiarity scores, wherein each familiarity score of the two or more familiarity scores corresponds to an instance of probe data of the two or more instances or probe data linked to form the first probe trajectory; and identifying a least familiar familiarity score from the two or more familiarity scores. In an example embodiment, when it is determined to select the first probe trajectory, the familiarity model is updated based on the two or more instances of probe data of the first probe trajectory. In an example embodiment, determining whether to select the first probe trajectory based on the least familiar familiarity score for the first probe trajectory comprises determining whether the least familiar familiarity score satisfies a familiarity threshold requirement. In an example embodiment, the familiarity threshold requirement is defined such that the traffic and/or map data has an application appropriate coverage of a corresponding road network. In an example embodiment, determining whether to select the first probe trajectory based on the least familiar familiarity score for the first probe trajectory comprises assigning a selection probability to the first probe trajectory and determining whether to select the first probe trajectory based on the selection probability. In an example embodiment, the selection probability is assigned such that the traffic and/or map data has an application appropriate coverage of a corresponding road network.

According to another aspect of the present invention, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive a plurality of instances of probe data. Each instance of probe data comprising location data indicating a location of a probe apparatus when the instance of probe data was generated and a timestamp indicating the date and/or time when the instance of probe data was generated. The at least one memory and the computer program code are further configured to, with the processor, cause the apparatus to at least generate a plurality of probe trajectories from the plurality of instances of probe data. A probe trajectory of the plurality of probe trajectories is generated by linking two or more instances of probe data corresponding to a same trip and time ordering the two or more instances of probe data based on the timestamp of each of the two or more instances of probe data. The at least one memory and the computer program code are further configured to, with the processor, cause the apparatus to at least define a set of selected probe trajectories by determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and, when it is determined to select the first probe trajectory, adding the first probe trajectory to the set of selected probe trajectories. The at least one memory and the computer program code are further configured to, with the processor, cause the apparatus to at least generate traffic and/or map data based on the set of selected probe trajectories; and provide the traffic and/or map data such that a consumer apparatus receives the traffic and/or map data.

In an example embodiment, the consumer apparatus is configured to use at least a portion of the traffic and/or map data to perform a navigation function. In an example embodiment, the familiarity model is a grid model. In an example embodiment, the traffic and/or map data is provided as part of a digital map or a tile of a digital map. In an example embodiment, the traffic and/or map data is generated by map-matching the selected probe trajectories of the set of selected probe trajectories. In an example embodiment, the traffic and/or map data comprises volume related traffic and/or map data which is determined by applying a correction factor that is determined based on a ratio of a density function of the plurality of instances of probe data to a density function of instances of probe data of selected probe trajectories of the set of selected probe trajectories. In an example embodiment, determining the least familiar familiarity score for the first probe trajectory comprises determining two or more familiarity scores, wherein each familiarity score of the two or more familiarity scores corresponds to an instance of probe data of the two or more instances or probe data linked to form the first probe trajectory; and identifying a least familiar familiarity score from the two or more familiarity scores. In an example embodiment, when it is determined to select the first probe trajectory, the familiarity model is updated based on the two or more instances of probe data of the first probe trajectory. In an example embodiment, determining whether to select the first probe trajectory based on the least familiar familiarity score for the first probe trajectory comprises determining whether the least familiar familiarity score satisfies a familiarity threshold requirement. In an example embodiment, the familiarity threshold requirement is defined such that the traffic and/or map data has an application appropriate coverage of a corresponding road network. In an example embodiment, determining whether to select the first probe trajectory based on the least familiar familiarity score for the first probe trajectory comprises assigning a selection probability to the first probe trajectory and determining whether to select the first probe trajectory based on the selection probability. In an example embodiment, the selection probability is assigned such that the traffic and/or map data has an application appropriate coverage of a corresponding road network.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive a plurality of instances of probe data. Each instance of probe data comprising location data indicating a location of a probe apparatus when the instance of probe data was generated and a timestamp indicating the date and/or time when the instance of probe data was generated. The computer-readable program code portions further comprise executable portions configured, when executed by a processor of an apparatus, to cause the apparatus to generate a plurality of probe trajectories from the plurality of instances of probe data. A probe trajectory of the plurality of probe trajectories is generated by linking two or more instances of probe data corresponding to a same trip and time ordering the two or more instances of probe data based on the timestamp of each of the two or more instances of probe data. The computer-readable program code portions further comprise executable portions configured, when executed by a processor of an apparatus, to cause the apparatus to define a set of selected probe trajectories by determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and, when it is determined to select the first probe trajectory, adding the first probe trajectory to the set of selected probe trajectories. The computer-readable program code portions further comprise executable portions configured, when executed by a processor of an apparatus, to cause the apparatus to generate traffic and/or map data based on the set of selected probe trajectories; and provide the traffic and/or map data such that a consumer apparatus receives the traffic and/or map data.

In an example embodiment, the consumer apparatus is configured to use at least a portion of the traffic and/or map data to perform a navigation function. In an example embodiment, the familiarity model is a grid model. In an example embodiment, the traffic and/or map data is provided as part of a digital map or a tile of a digital map. In an example embodiment, the traffic and/or map data is generated by map-matching the selected probe trajectories of the set of selected probe trajectories. In an example embodiment, the traffic and/or map data comprises volume related traffic and/or map data which is determined by applying a correction factor that is determined based on a ratio of a density function of the plurality of instances of probe data to a density function of instances of probe data of selected probe trajectories of the set of selected probe trajectories. In an example embodiment, determining the least familiar familiarity score for the first probe trajectory comprises determining two or more familiarity scores, wherein each familiarity score of the two or more familiarity scores corresponds to an instance of probe data of the two or more instances or probe data linked to form the first probe trajectory; and identifying a least familiar familiarity score from the two or more familiarity scores. In an example embodiment, when it is determined to select the first probe trajectory, the familiarity model is updated based on the two or more instances of probe data of the first probe trajectory. In an example embodiment, determining whether to select the first probe trajectory based on the least familiar familiarity score for the first probe trajectory comprises determining whether the least familiar familiarity score satisfies a familiarity threshold requirement. In an example embodiment, the familiarity threshold requirement is defined such that the traffic and/or map data has an application appropriate coverage of a corresponding road network. In an example embodiment, determining whether to select the first probe trajectory based on the least familiar familiarity score for the first probe trajectory comprises assigning a selection probability to the first probe trajectory and determining whether to select the first probe trajectory based on the selection probability. In an example embodiment, the selection probability is assigned such that the traffic and/or map data has an application appropriate coverage of a corresponding road network.

According to yet another aspect of the present invention, an apparatus is provided. In an example embodiment, the apparatus comprises a processor, a memory, and a communication interface configured to communicate via at least one network. In an example embodiment, the apparatus comprises means for receiving a plurality of instances of probe data. Each instance of probe data comprising location data indicating a location of a probe apparatus when the instance of probe data was generated and a timestamp indicating the date and/or time when the instance of probe data was generated. In an example embodiment, the apparatus comprises means for generating a plurality of probe trajectories from the plurality of instances of probe data. A probe trajectory of the plurality of probe trajectories is generated by linking two or more instances of probe data corresponding to a same trip and time ordering the two or more instances of probe data based on the timestamp of each of the two or more instances of probe data. In an example embodiment, the apparatus comprises means for defining a set of selected probe trajectories. Defining the set of selected probe trajectories comprises determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and when it is determined to select the first probe trajectory, adding the first probe trajectory to the set of selected probe trajectories. In an example embodiment, the apparatus comprises means for generating traffic and/or map data based on the set of selected probe trajectories. In an example embodiment, the apparatus comprises means for providing the traffic and/or map data such that a consumer apparatus receives the traffic and/or map data.

According to yet another aspect of the present invention, a component of an apparatus is provided. In an example embodiment, the component comprises a computer-readable medium. In an example embodiment, the component comprises a digital map stored on the computer-readable medium. The digital map comprises a first plurality of data records. Each of the first plurality of data records represents a corresponding TME. At least some of the first plurality of data records further comprise traffic and/or map data for the corresponding TME generated by receiving, by an analysis apparatus, a plurality of instances of probe data, each instance of probe data comprising location data indicating a location of a probe apparatus when the instance of probe data was generated and a timestamp indicating the date and/or time when the instance of probe data was generated; generating, by the analysis apparatus, a plurality of probe trajectories from the plurality of instances of probe data, wherein a probe trajectory of the plurality of probe trajectories is generated by linking two or more instances of probe data corresponding to a same trip and time ordering the two or more instances of probe data based on the timestamp of each of the two or more instances of probe data; defining, by the analysis apparatus, a set of selected probe trajectories, wherein defining the set of selected probe trajectories comprises determining a least familiar familiarity score for a first probe trajectory of the plurality of probe trajectories based on a familiarity model corresponding to instances of probe data of selected probe trajectories of the set of selected probe trajectories, determining whether to select the first probe trajectory based on the least familiar familiarity score for the first probe trajectory, and when it is determined to select the first probe trajectory, adding the first probe trajectory to the set of selected probe trajectories; map matching one or more probe trajectory segments corresponding to one or more probe trajectories of the set of selected probe trajectories to the corresponding TME; and generating, by the analysis apparatus, traffic and/or map data for the corresponding TME based on the one or more probe trajectory segments map-matched to the corresponding TME.

In an example embodiment, the traffic and/or map data is configured for use in perform a navigation function. In an example embodiment, the familiarity model is a grid model. In an example embodiment, the traffic and/or map data is generated by map-matching the selected probe trajectories of the set of selected probe trajectories. In an example embodiment, the traffic and/or map data comprises volume related traffic and/or map data which is determined by applying a correction factor that is determined based on a ratio of a density function of the plurality of instances of probe data to a density function of instances of probe data of selected probe trajectories of the set of selected probe trajectories. In an example embodiment, determining the least familiar familiarity score for the first probe trajectory comprises determining two or more familiarity scores, wherein each familiarity score of the two or more familiarity scores corresponds to an instance of probe data of the two or more instances or probe data linked to form the first probe trajectory; and identifying a least familiar familiarity score from the two or more familiarity scores. In an example embodiment, when it is determined to select the first probe trajectory, the familiarity model is updated based on the two or more instances of probe data of the first probe trajectory. In an example embodiment, determining whether to select the first probe trajectory based on the least familiar familiarity score for the first probe trajectory comprises determining whether the least familiar familiarity score satisfies a familiarity threshold requirement. In an example embodiment, the familiarity threshold requirement is defined such that the traffic and/or map data has an application appropriate coverage of a corresponding road network. In an example embodiment, determining whether to select the first probe trajectory based on the least familiar familiarity score for the first probe trajectory comprises assigning a selection probability to the first probe trajectory and determining whether to select the first probe trajectory based on the selection probability. In an example embodiment, the selection probability is assigned such that the traffic and/or map data has an application appropriate coverage of a corresponding road network.

BRIEF DESCRIPTION OF THE DRAWINGS

Figure 1:
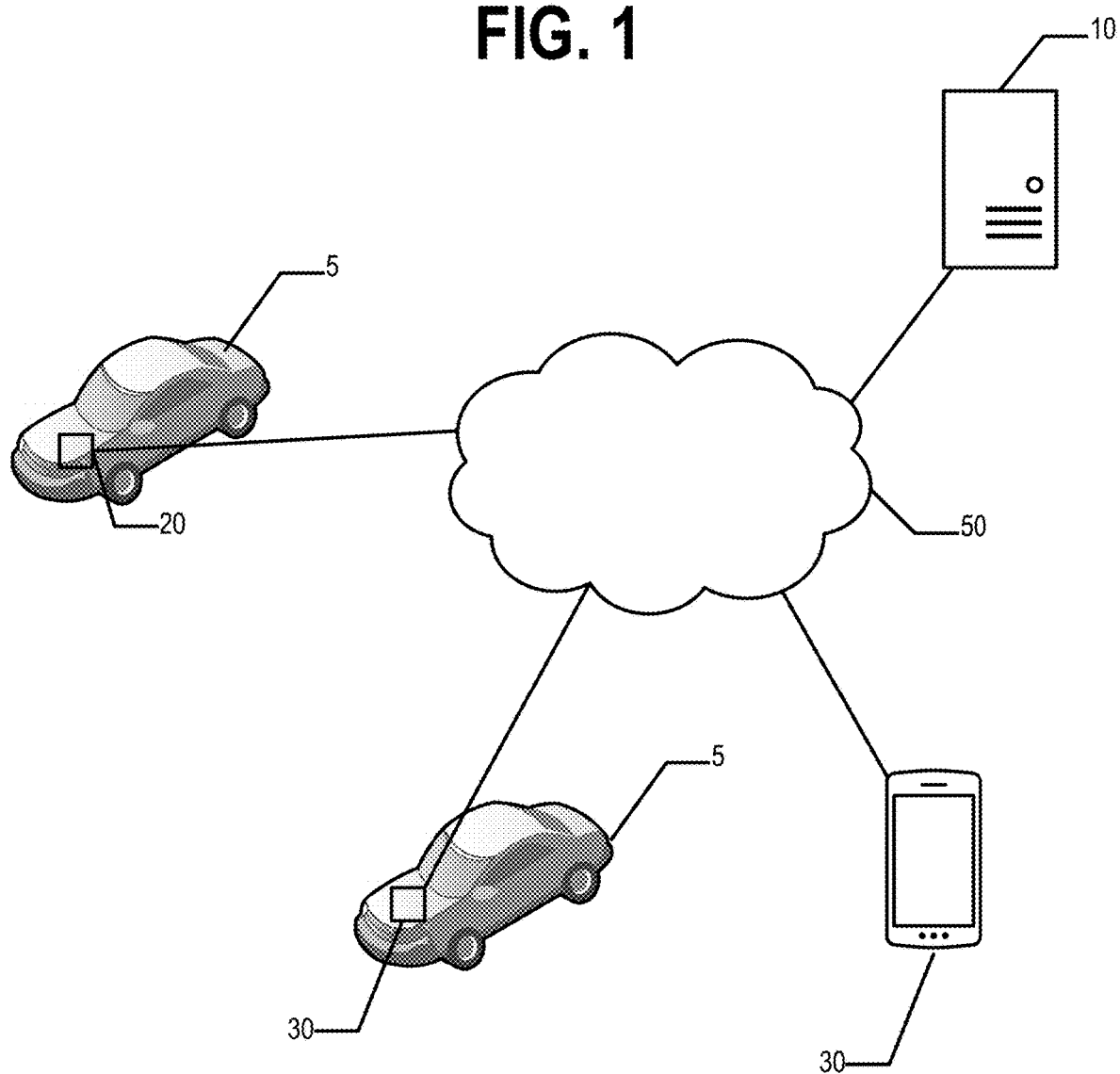
Figure 2A:
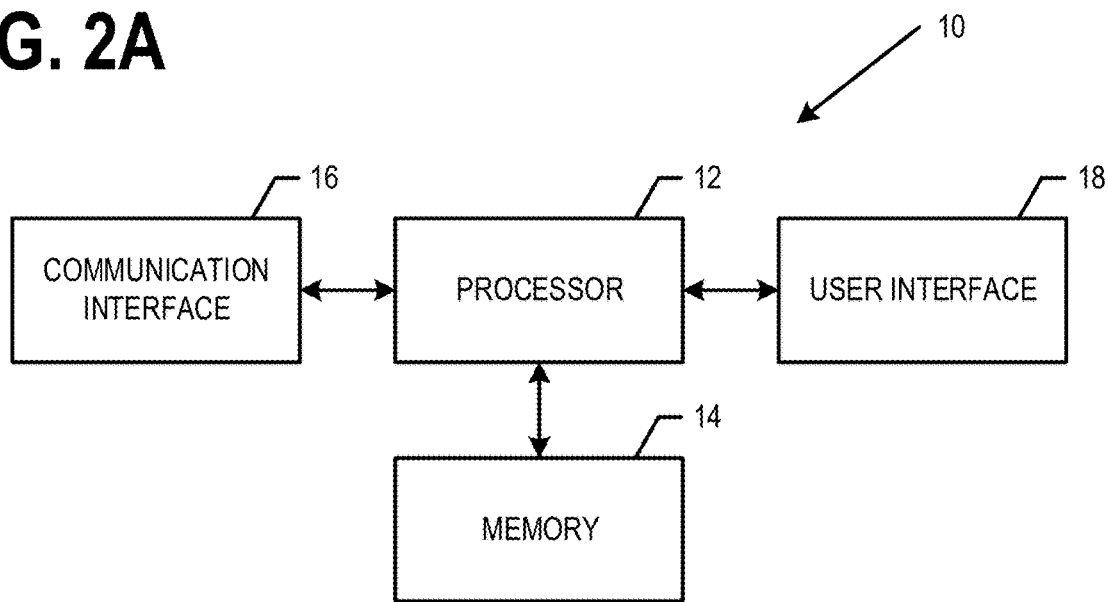
Figure 2B:
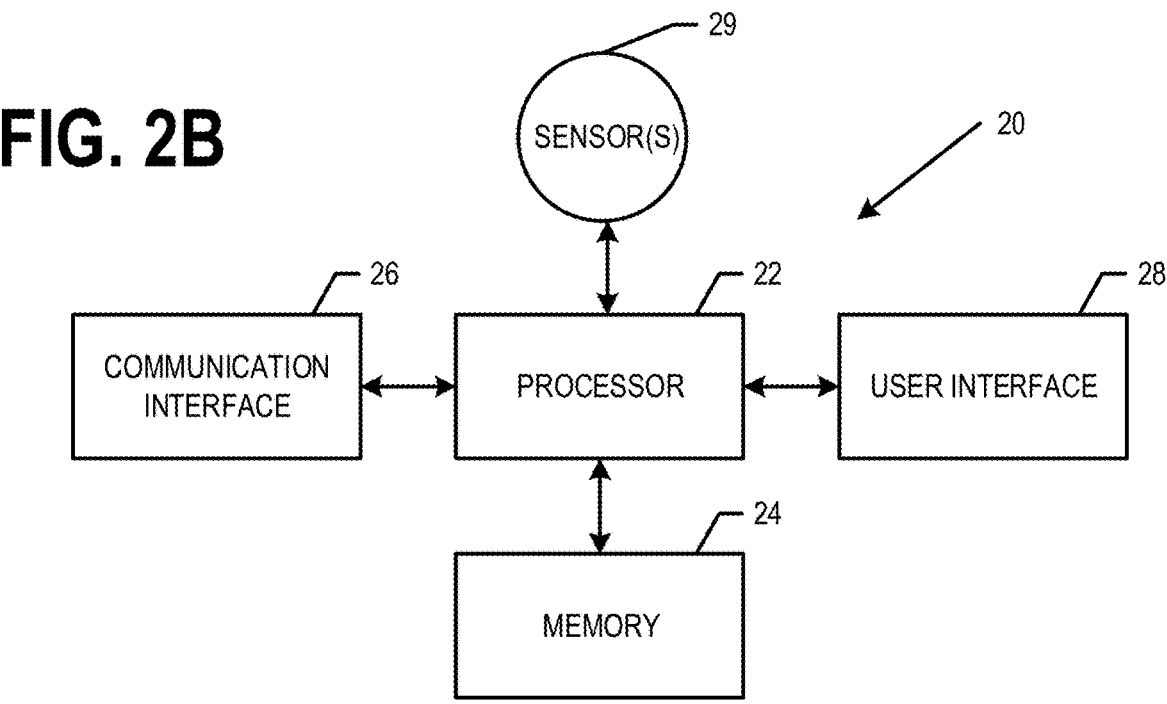
Figure 2C:
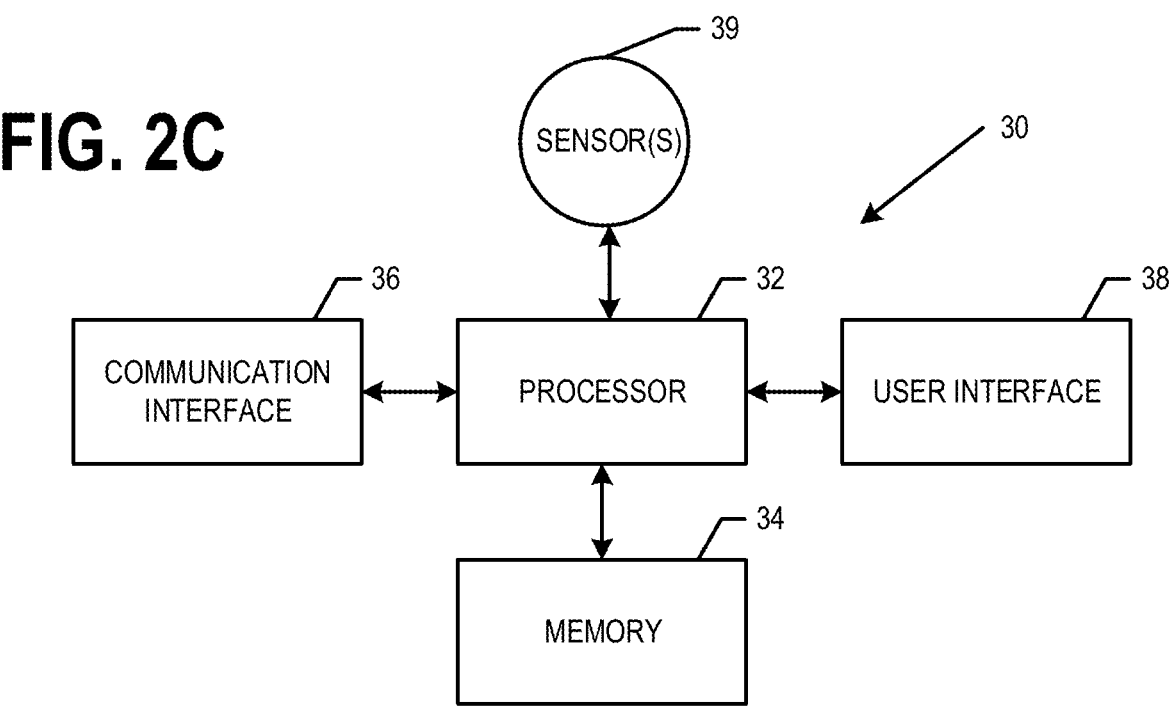
Figure 3:
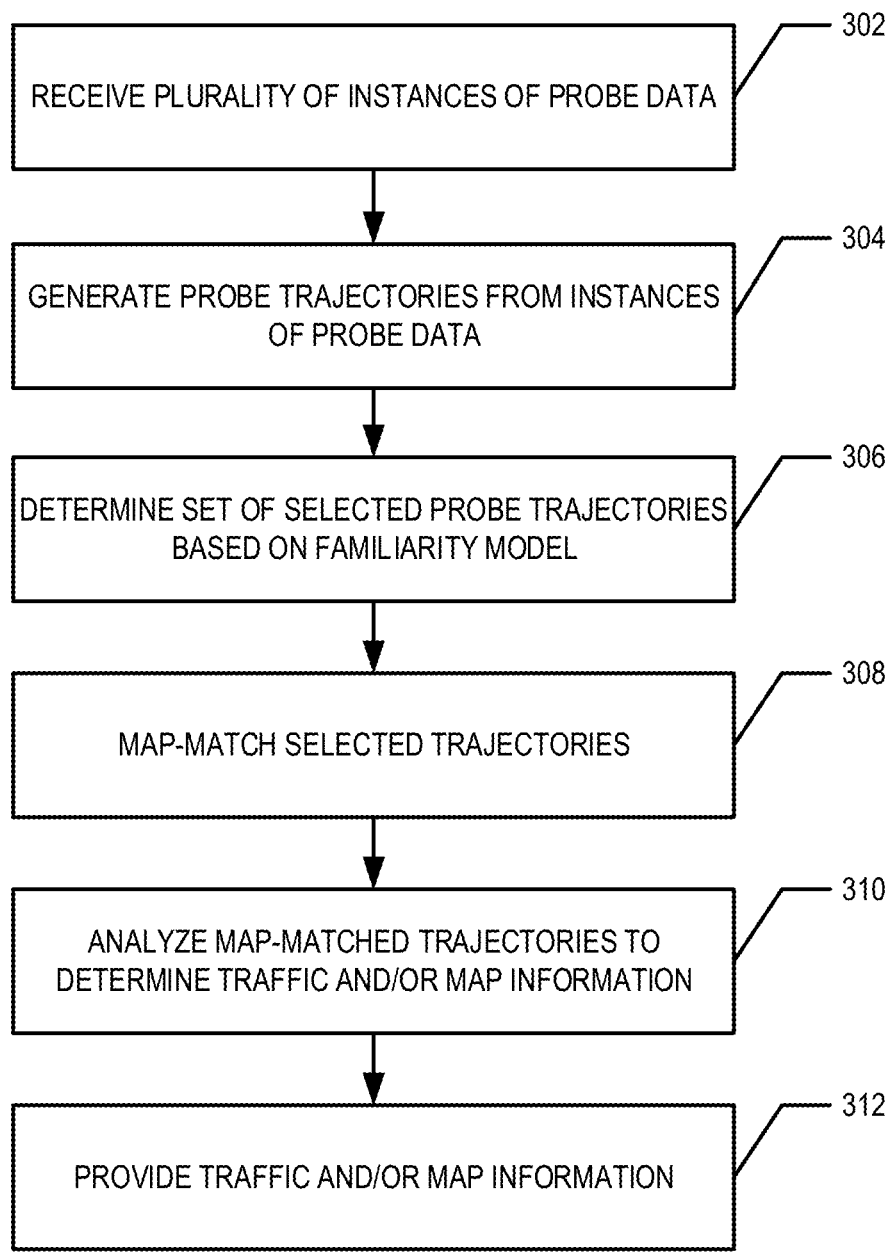
Figure 4:
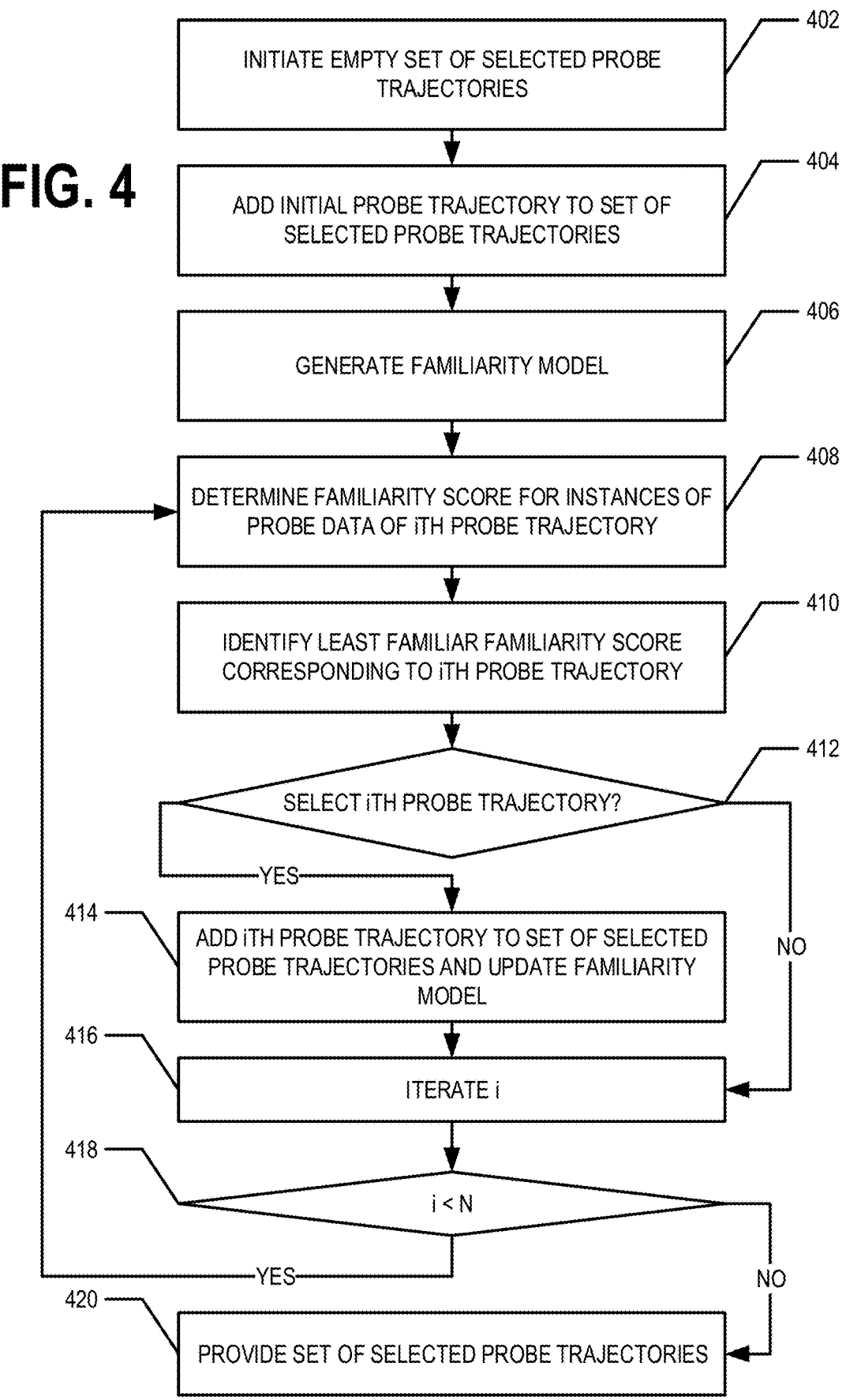
Figure 5A:
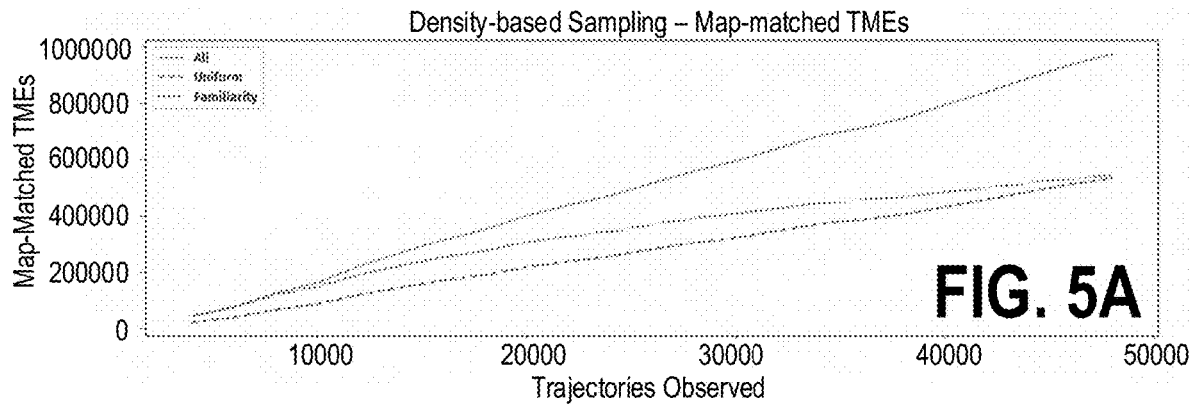
Figure 5B:
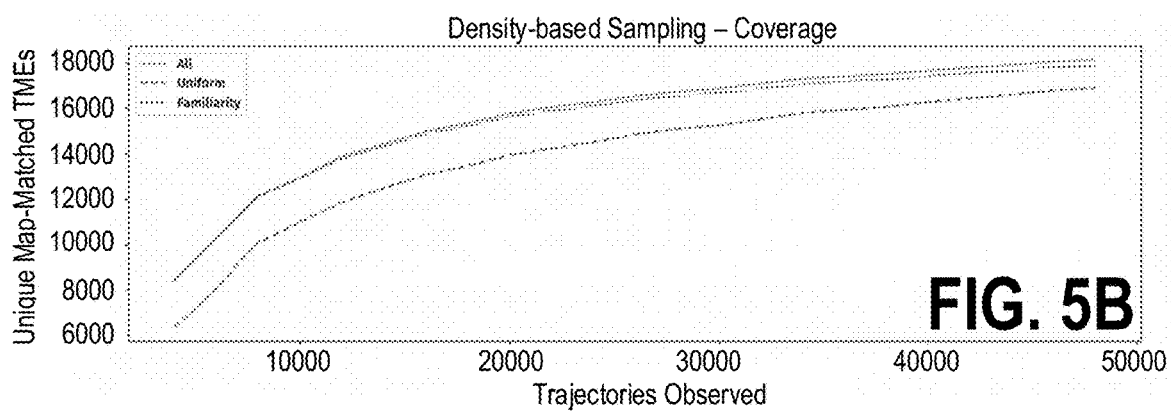
Figure 5C:
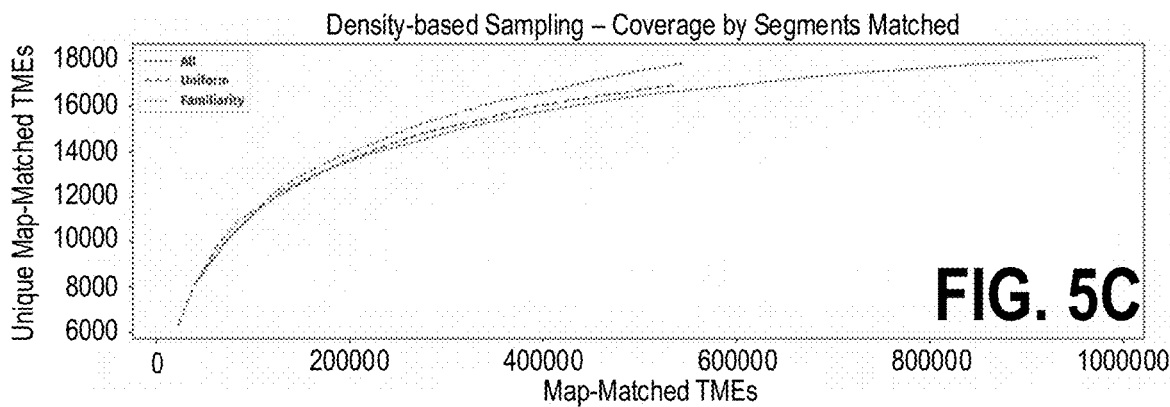
Figure 6:
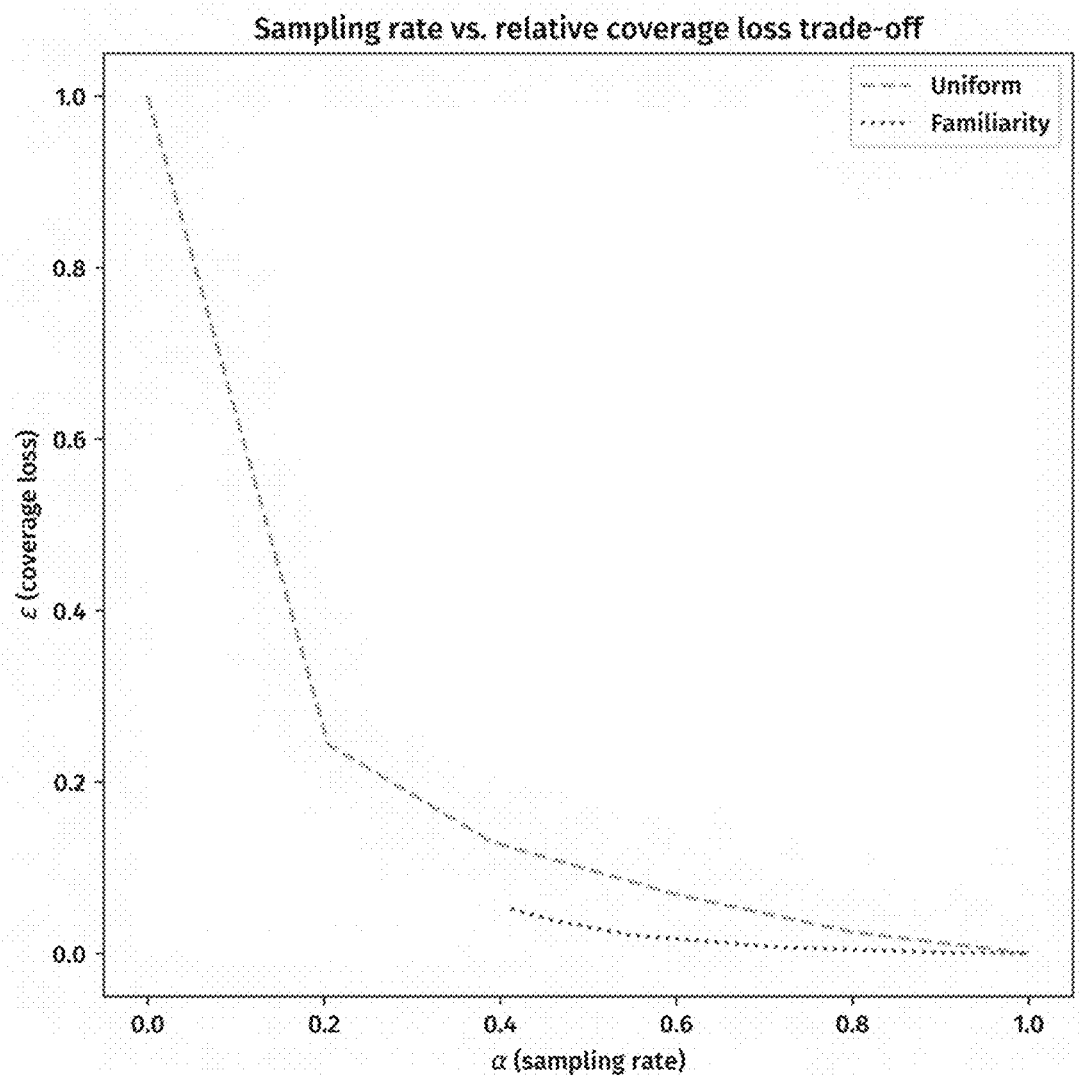
Figure 7:
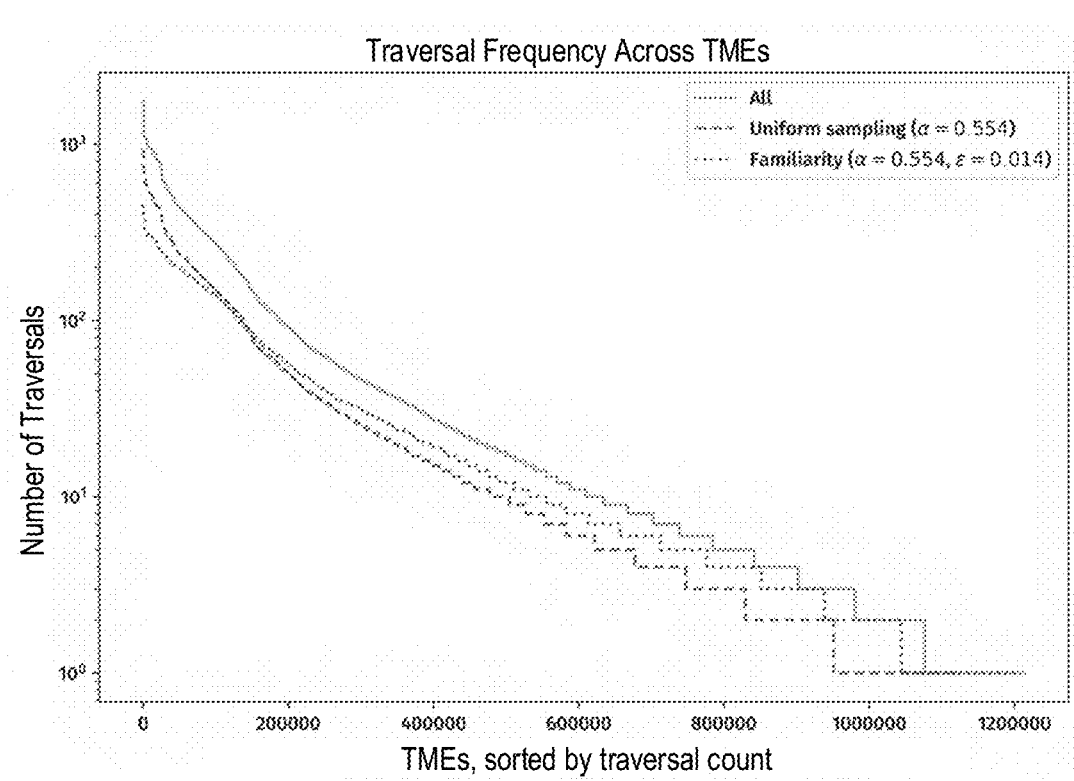

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an analysis apparatus that may be specifically configured in accordance with an example embodiment;

FIG. 2B is a block diagram of a probe apparatus that may be specifically configured in accordance with an example embodiment;

FIG. 2C is a block diagram of a consumer apparatus that may be specifically configured in accordance with an example embodiment;

FIG. 3 is a flowchart illustrating operations performed, such as by the analysis apparatus of FIG. 2A to provide traffic and/or map information/data, in accordance with an example embodiment;

FIG. 4 is a flowchart illustrating operations performed, such as by the analysis apparatus of FIG. 2A to determine a set of selected probe trajectories, in accordance with an example embodiment;

FIG. 5A provides a plot illustrating example simulation results indicating the number of TMEs to which selected probe trajectories are map-matched as a function of the number of observed probe trajectories for three different selection processes, in accordance with an example embodiment;

FIG. 5B provides a plot illustrating example simulation results indicating the number of unique TMEs to which selected probe trajectories are map-matched as a function of the number of observed probe trajectories for three different selection processes, in accordance with an example embodiment;

FIG. 5C provides a plot illustrating example simulation results indicating the number of unique TMEs to which selected probe trajectories are map-matched as a function of the number of map-matched probe trajectories for three different selection processes, in accordance with an example embodiment;

FIG. 6 provides a plot illustrating example simulation results of the coverage loss as a function of the sampling rate $\alpha$ for two different selection processes, in accordance with an example embodiment; and FIG. 7 provides a plot illustrating the number of traversals, on a log scale, along each TME to which one or more probe trajectories was map-matched for three different selection processes, in accordance with an example embodiment.

DETAILED DESCRIPTION OF SOME
EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment in order to generate and/or determine traffic and/or map information/data in a computationally efficient manner. Methods, apparatus, systems, and computer program products are provided in accordance with an example embodiment in order to generate and/or determine traffic information/data having an application appropriate coverage and/or computational expense level. Methods, apparatus, systems, and computer program products are provided in accordance with an example embodiment in order to generate and/or determine traffic and/or map information/data that is robust against deanonymization attacks.

In various embodiments, an analysis apparatus receives a plurality of instances of probe information/data from a plurality of probe apparatuses. The analysis apparatus links two or more instances of probe information/data (e.g., based on a session identifier associated with and/or provided as part of each instance of the two or more instances of probe information/data) into a time-ordered sequence to generate a probe trajectory representing the movement of the corresponding probe apparatus through at least a portion of a geographical area corresponding to a road network. A plurality of the generated probe trajectories are selected for analysis based on the desired coverage of the resulting traffic and/or map information/data and/or the computational resources available and/or slated for use in the generating and/or determining of the traffic and/or map information/data from the probe information/data. The selected probe trajectories may then be map-matched and analyzed to generate and/or determine the traffic and/or map information/data corresponding to the road network and/or portion of the road network. Once the traffic and/or map information/data is determined, it may be provided to one or more consumer apparatuses. For example, the traffic and/or map information/data may be provided to one or more consumer apparatuses located on and/or near the road network and/or portion of the road network. In an example embodiment, the traffic and/or map information/data may be provided to one or more consumer apparatuses that are expected (e.g., based on past behavior, a route currently being followed up the consumer apparatus, and/or the like) to be on or near the road network and/or portion of the road network. In various embodiments, a consumer apparatus may use the traffic and/or map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like.

In various embodiments, the selection of the probe trajectories to be map-matched and/or used to generate and/or determine the traffic and/or map information/data is performed based on the spatial familiarity of at least one instance of probe information/data of a probe trajectory. In an example embodiment, the spatial familiarity of an instance of probe information/data corresponds to how spatial similar the location information/data of the instance of probe information/data is to the instances of probe information/data of probe trajectories that have already/previously selected. In an example embodiment, the selection of a probe trajectory is based on the least spatially familiar instance of probe information/data of the two or more instance of probe information/data that were linked to generate the probe trajectory. For example, a spatial familiarity score may be determined for each instance of probe information/data linked to generate the probe trajectory. The least familiar familiarity of the probe trajectory, which is the familiarity score associated with the instance of probe information/data of the probe trajectory having the familiarity score indicating the least amount of spatial familiarity, may then be used to determine whether the probe trajectory is to be selected or not. In an example embodiment, the determination of whether or not the probe trajectory is to be selected or not may be based on the comparison of the least familiar familiarity score of the probe trajectory with a familiarity threshold requirement. In an example embodiment, the determination of whether or not the probe trajectory is to be selected or not may be a probabilistic selection of probe trajectories, where probe trajectories having less familiar least familiar familiarity scores are more likely to be selected compared to probe trajectories having more familiar least familiar familiarity scores.

In various embodiments, each instance of probe information/data comprises location information/data indicating a location of a corresponding probe apparatus when the instance of probe information/data was captured, a timestamp indicating the date and/or time at which the instance of probe information/data was captured, and a session identifier configured to enable the analysis apparatus to link instances of probe information/data generated by the same probe apparatus and/or the same probe apparatus during a single trip and/or ignition cycle of a corresponding probe vehicle. In various embodiments, the instance of probe information/data may further comprise speed information/data indicating a travel speed of the probe apparatus, information/data captured by one or more sensors onboard the probe vehicle, a result of analysis of information/data captured by one or more sensors onboard the probe vehicle, and/or the like.

In various embodiments, the spatial familiarity score for an instance of probe information/data is determined based on a spatial familiarity model. For example, the probe trajectories may be selected in series, such that the spatial familiarity (e.g., similarity) between a particular probe trajectory (e.g., the instances of probe information/data thereof) being considered for selection may be determined based on the already selected probe trajectories. In an example embodiment, the spatial familiarity of an instance of probe information/data may be determined by comparing the location information/data of the instance of probe information/data to a familiarity and/or spatial coverage model corresponding to the already/previously selected probe trajectories. In an example embodiment, the familiarity and/or spatial coverage model is a tree data structure (e.g., a K-D tree). In an example embodiment, the familiarity and/or spatial coverage model is a grid model. For example, the location information/data of each already/previously selected probe trajectory is binned based on its proximity to a grid point. For example, as described above, the sampling of the space provided by the plurality of instances of probe information/data is non-uniform. This non-uniformity may be taken advantage of by binning the kernel density estimator. In an example embodiment, a linear binning approximation is used for kernel density estimation such that data points are redistributed along a fixed-size grid, so that the grid only stores a weight value for every grid point, where the weight is inversely proportional to how close a data point fell to that grid point.

In various embodiments, only the selected probe trajectories are processed for use in generating and/or determining the traffic and/or map information/data. For example, the selected probe trajectories may be map-matched to a TME. In various embodiments, a TME may be a link or segment of road network (e.g., defined by an intersection and/or node located at each end of the link or road segment) or a traversable lane of a link or road segment of the road network. For example, each instance of probe information/data of a probe trajectory may be map-matched to a TME of a digital map that represents a road network. In an example embodiment, the probe trajectory is segmented into probe trajectory segments, wherein each probe trajectory segment includes the instances of probe information/data of the probe trajectory that were map-matched to the same TME. For example, a first probe trajectory segment includes the instances of probe information/data of the probe trajectory that were map-matched to a first TME. The probe trajectory segments may be binned and/or grouped based on the corresponding map-matched TME, and then each bin and/or group of probe trajectory segments may be analyzed to generate and/or determine traffic and/or map information/data for the corresponding TME. The traffic and/or map information/data corresponding to a TME may be provided by itself, packaged with traffic and/or map information/data corresponding to other TMEs, and/or packaged as a layer, for example, of a digital map and/or a digital map tile (e.g., a pre-defined portion of the digital map that represents a portion of the road network that corresponds to the TME to which the traffic and/or map information/data corresponds). As indicated above, the analysis apparatus may provide the traffic and/or map information/data (possibly as part of a digital map and/or digital map tile) such that one or more consumer apparatuses receive the traffic and/or map information/data such that at least one of the one or more consumer apparatuses may use the traffic and/or map information/data for performing one or more navigation functions.

In various embodiments, the selection process used to select the probe trajectories provides an improvement to the art. For example, the selection process ensures that an application specific appropriate level of coverage of the road network is provided by the generated and/or determined traffic and/or map information/data while reducing the computational resources required for generating and/or determining the traffic and/or map information/data and increasing the resiliency of the traffic and/or map information/data to deanonymization attacks.

FIG. 1 provides an illustration of an example system that can be used in conjunction with various embodiments of the present invention. As shown in FIG. 1, the system may include one or more analysis apparatuses 10, one or more probe apparatuses 20, wherein each probe apparatus 20 is disposed on a vehicle 5, one or more consumer apparatuses 30, one or more networks 50, and/or the like. In various embodiments, a consumer apparatus 30 may be a mobile computing entity and/or mobile apparatus. For example, a consumer apparatus 30 may be onboard a vehicle 5. In various embodiments, the probe apparatus 20 and/or consumer apparatus 30 may be an in vehicle navigation system, vehicle control system, a mobile computing device, a mobile data gathering platform, and/or the like. For example, a probe apparatus 20 and/or consumer apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 and/or consumer apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like.

In various embodiments, the probe apparatus 20 and/or consumer apparatus 30 is configured to autonomously drive a vehicle 5 may perform multiple functions that are similar to those performed by a probe apparatus 20 and/or consumer apparatus 30 configured to be an ADAS (e.g., lane keeping, lane change assistance, maintaining a lane, merging, etc.). In some embodiments, a probe apparatus 20 and/or consumer apparatus 30 may be onboard a personal vehicle, commercial vehicle, public transportation vehicle, fleet vehicle, and/or other vehicle. In various embodiments, the probe apparatus 20 and/or consumer apparatus 30 may be a smartphone, tablet, personal digital assistant (PDA), personal computer, desktop computer, laptop, and/or other mobile computing device. In an example embodiment, the probe apparatus 20 are onboard fleet vehicles and comprise a mobile data gathering platform. In an example embodiment, a consumer apparatus 30 is onboard a vehicle 5 and is used to perform one or more navigation functions corresponding to the vehicle 5 traversing at least a portion of a road network.

In an example embodiment, the analysis apparatus 10 may be a server, group of servers, distributed computing system, and/or other computing system. In an example embodiment, the analysis apparatus 10 is not located onboard a vehicle. For example, the analysis apparatus 10 may be in communication with one or more probe apparatuses 20, one or more consumer apparatuses 30, and/or the like via one or more wired or wireless networks 50.

In an example embodiment, an analysis apparatus 10 may comprise components similar to those shown in the example analysis apparatus 10 diagrammed in FIG. 2A. In an example embodiment, the analysis apparatus 10 is configured to receive instances of probe information/data from one or more probe apparatuses 20, generate and/or determine traffic and/or map information/data based on received instances of probe information/data, provide the traffic and/or or map information/data, and/or the like. For example, as shown in FIG. 2A, the analysis apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, a probe apparatus 20 is onboard a vehicle 5. In an example embodiment, the probe apparatus 20 may be configured to capture sensor information/data via one or more sensors onboard the vehicle 5, generate instances of probe information/data based on the sensor information/data, and provide the instances of probe information/data such that an analysis apparatus 10 receives the instances of probe information/data. In an example embodiment, the probe apparatus 20 is configured to determine location information/data (e.g., geolocation such as latitude and longitude and/or the like) indicating a location of the vehicle 5 and/or probe apparatus 20 when the corresponding sensor information/data was captured. In an example, location information/data indicates a position and/or heading of the vehicle 5 at the time the sensor information/data was captured. In an example embodiment, the probe apparatus 20 is configured to determine a timestamp indicating the date and/or time that the instance of sensor information/data was captured. In various embodiments, an instance of probe information/data comprises the location information/data indicating a location of the probe apparatus 20 when the instance of probe information/data was captured, the timestamp indicating the date and/or time at which the instance of probe information/data was captured, and a session identifier configured to enable the analysis apparatus to link instances of probe information/data generated by the probe apparatus 20 and/or the same probe apparatus 20 during a single trip and/or ignition cycle of a corresponding probe vehicle 5. In various embodiments, the instance of probe information/data may further comprise speed information/data indicating a travel speed of the probe apparatus 20, information/data captured by one or more sensors onboard the vehicle 5, a result of analysis of information/data captured by one or more sensors onboard the vehicle 5, and/or the like.

In an example embodiment, as shown in FIG. 2B, the probe apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a consumer apparatus 30 is configured to consume traffic and/or map information/data. For example, a consumer apparatus 30 may be configured to receive traffic and/or map information/data and perform one or more navigation functions using at least a portion of the traffic and/or map information/data as an input for performing the one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like. In an example embodiment, the consumer apparatus 30 is onboard a vehicle 5 and/or is a mobile computing entity. In an example embodiment, the consumer apparatus 30 may be configured to receive map and/or traffic information/data as part of a digital map and/or one or more digital map tiles. In an example embodiment, as shown in FIG. 2C, the consumer apparatus 30 may comprise a processor 32, memory 34, a communications interface 36, a user interface 38, one or more sensors 39 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the consumer apparatus 30 to determine one or more features of the corresponding vehicle's 5 surroundings and/or monitor the vehicle's 5 operating parameters), and/or other components configured to perform various operations, procedures, functions or the like described herein. In at least some example embodiments, the memory 34 is non-transitory.

In an example embodiment, the analysis apparatus 10 may be in communication with one or more of probe apparatuses 20, and/or one or more consumer apparatuses 30. In an example embodiment, the analysis apparatus 10 may receive instances of probe information/data, generate and/or determine traffic and/or map information/data and provide the traffic and/or map information/data. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 and/or consumer apparatus 30 may be in communication with an analysis apparatus 10 via the network 50. For example, a probe apparatus 20 and/or consumer apparatus 30 may communicate with the analysis apparatus 10 via a network, such as the Cloud. For example, the Cloud may be a computer network that provides shared computer processing resources and data to computers and other devices connected thereto. For example, the probe apparatus 20 may be configured to provide one or more instances of probe information/data via the network 50. For example, the analysis apparatus 10 may configured to receive a plurality of instances of probe information/data, and provide traffic and/or map information/data, and/or digital maps and/or digital maps tiles comprising traffic and/or map information/data via the network 50. For example, a consumer apparatus 30 may be configured to receive traffic and/or map information/data, and/or digital maps and/or digital maps tiles comprising traffic and/or map information/data via the network 50.

Certain example embodiments of the analysis apparatus 10, probe apparatus 20, and/or consumer apparatus 30 are described in more detail below with respect to FIGS. 2A, 2B, and 2C.

II. Example Operation

Example embodiments provide methods, apparatus, systems, computer program products, and/or the like for generating and/or determining traffic and/or map information/data based on a set of selected probe trajectories. In various embodiments, the traffic and/or map information/data is provided for use by a consumer apparatus 30 configured to use at least a portion of the traffic and/or map information/data to perform one or more navigation functions. In various embodiments, a plurality of instances of probe information/data are received by an analysis apparatus 10. The analysis apparatus 10 links two or more instances of probe information/data in a time-ordered sequence based on session identifiers and timestamps of the two or more instances of probe information/data. In various embodiments, N probe trajectories are generated from the plurality of instances of probe information/data and M of the N probe trajectories are selected and added to a set of selected probe trajectories. In various embodiments, M≤N. For example, in various embodiments, the set of selected probe trajectories does not include all N of the generated probe trajectories. In various embodiments, the M probe trajectories of the set of selected probe trajectories are selected using a familiarity model. Various features of some example embodiments will now be described in more detail.

a. Generating and/or Determining and Providing Traffic and/or Map Information/Data In various embodiments, one or more probe apparatuses 20 generate and provide a plurality of instances of probe information/data such that an analysis apparatus 10 receives the plurality of instances of probe information/data. The analysis computing entity 10 generates probe trajectories from the plurality of instances of probe information/data and then defines a set of selected probe trajectories based on a familiarity model. In various embodiments, a probe trajectory is a time-ordered sequence of two or more instances of probe information/data generated by the same probe apparatus 20 during a single trip and/or ignition cycle of a corresponding vehicle 5. In various embodiments, the familiarity model is configured to describe a spatial coverage of the selected probe trajectories of the set of selected probe trajectories. The analysis apparatus 10 may then analyze the set of selected probe trajectories to generate and/or determine traffic and/or map information/data. The analysis apparatus 10 may then provide the traffic and/or map information/data such that a consumer apparatus 30 receives the traffic and/or map information/data. In an example embodiment, the traffic and/or map information/data is provided as part of a digital map and/or a tile of a digital map. The consumer apparatus 30 may then use at least a portion of the traffic information/data to perform one or more navigation functions.

FIG. 3 provides a flowchart illustrating operations performed, such as by the analysis apparatus 10 of FIG. 2A to provide a traffic and/or map information/data. Starting at block 302, a plurality of instances of probe information/data are received. For example, the analysis apparatus 10 may receive a plurality of instances of probe information/data. For example, the analysis apparatus 10 may comprise means, such as processor 12, memory 14, communications interface 16, and/or the like, for receiving a plurality of instances of probe information/data.

In various embodiments, each instance of probe information/data is generated by a probe apparatus 20 as the probe apparatus 20 traverses at least a portion of a road network. In various embodiments, the probe apparatus 20 is onboard a vehicle 5. For example, as the probe apparatus 20 and/or vehicle 5 traverses at least a portion of the road network, one or more sensors 29 may capture sensor information/data and communicate the sensor information/data to the probe apparatus 20. For example, the probe apparatus 20 may capture sensor information/data. For example, the probe apparatus 20 may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the probe apparatus 20 may concurrently determine location information/data indicating a location of the vehicle 5 and/or the probe apparatus 20 and a timestamp corresponding to the date and/or time at which the location information/data is determined and sensor information/data is captured. For example, the vehicle apparatus 20 may determine a location information/data determining the location of the vehicle 5 and/or the probe apparatus 20 based on GNSS information/data, IMU sensor information/data, visual odometry (e.g., based on one or more digital images), and/or other localization techniques and/or a combination thereof. In various embodiments, the probe apparatus 20 comprises and/or is communication with an apparatus comprising a clock such that the probe apparatus 20 may determine a timestamp corresponding to the date and/or time at which the location of the vehicle 5 and/or the probe apparatus 20 is determined and the sensor information/data is captured.

In various embodiments, the probe apparatus 20 may generate an instance of probe information/data based on the sensor information/data captured at the date and/or time indicated by the timestamp. In various embodiments, an instance of probe information/data comprises the location information/data indicating a location of the vehicle 5 and/or probe apparatus 20 when the instance of probe information/data was captured, the timestamp indicating the date and/or time at which the instance of probe information/data was captured, and a session identifier configured to enable the analysis apparatus 10 to link instances of probe information/data generated by the probe apparatus 20 and/or the same probe apparatus 20 during a single trip and/or ignition cycle of a corresponding probe vehicle 5. In various embodiments, the instance of probe information/data may further comprise speed information/data indicating a travel speed of the probe apparatus 20, information/data captured by one or more sensors onboard the vehicle 5, a result of analysis of information/data captured by one or more sensors onboard the vehicle 5, and/or the like.

The generated instance of probe information/data may be provided such that the analysis apparatus 10 receives the instance of probe information/data. For example, the probe apparatus 20 may provide the instance of probe information/data such that an analysis apparatus 10 receives the instance of probe information/data. For example, the probe apparatus 20 may comprise means, such as processor 22, memory 24, communications interface 26, and/or the like, for providing an instance of probe information/data such that the analysis apparatus 10 receives the instance of probe information/data. In various embodiments, the probe apparatus 20 generates instances of probe information/data in response to a trigger (e.g., corresponding to a location of the vehicle 5 and/or probe apparatus 20 and/or a particular time) and/or periodically/regularly (e.g., based a time interval and/or distance traveled interval).

At block 304, a plurality of probe trajectories are generated from the plurality of instances of probe information/data. For example, the analysis apparatus 10 may generate a plurality of probe trajectories from the plurality of instances of probe information/data. For example, the analysis apparatus 10 may comprise means, such as processor 12, memory 14, and/or the like for generating a plurality of probe trajectories from the plurality of instances of probe information/data. In various embodiments, a probe trajectory is a time-ordered sequence of two or more instances of probe information/data that were generated by the same probe apparatus 20. In an example embodiment, each of the two or more instances of probe information/data of a probe trajectory were generated during the same trip and/or ignition cycle of the corresponding vehicle 5. For example, a probe trajectory may comprise two or more instances of probe information/data generated by the same probe apparatus 20 during a same trip and/or vehicle ignition cycle. In an example embodiment, a probe trajectory may be generated by identifying two or more instances of probe information/data comprising the same session identifier and then time ordering the two or more instances of probe information/data based on the timestamp of each of the two or more instances of probe information/data. In various embodiments, it may be determined that a trip corresponding to a probe apparatus 20 has been completed and/or finished in response to the probe apparatus 20 experiencing a speed of approximately 0 for a threshold time period (e.g., ten minutes, fifteen minutes, and/or the like). In an example embodiment, it may be determined that a trip corresponding to a probe apparatus 20 has been completed and/or finished in response to the location of the probe apparatus 20 approximately not changing for a threshold time period.

At block 306, one or more of the probe trajectories are selected from the plurality of probe trajectories. For example, a set of selected probe trajectories is defined, generated, and/or determined by selecting one or more of the probe trajectories from the plurality of probe trajectories. For example, the analysis apparatus 10 may select one or more probe trajectories from the plurality of probe trajectories to define, generate, and/or determine a set of selected probe trajectories. For example, the analysis apparatus 10 may comprise means, such as processor 12, memory 14, and/or the like, for selecting one or more probe trajectories from the plurality of probe trajectories to define, generate, and/or determine a set of selected probe trajectories. In various embodiments, the selection of probe trajectories from the plurality of probe trajectories is performed based on a familiarity score corresponding to an instance of probe information/data of the probe trajectory. For example, a familiarity score may be generated and/or determine for each instance of probe information/data of a probe trajectory (e.g., by the analysis apparatus 10). In various embodiments, the familiarity score corresponding to a particular instance of probe information/data describes the spatial similarity between the location indicated by the location information/data of the particular instance of probe information/data and one or more other instances of probe information/data that are part of a selected probe trajectory. For example, the spatial similarity between two instances of probe information/data may correspond to a Euclidean distance between two instances of probe information/data, a probability that two instances of probe information/data correspond to the same TME, and/or the like. For example, in an example embodiment, a familiarity score corresponding to the particular instance of probe information/data may provide an aggregated measure of the spatial similarity between the particular instance of probe information/data and each instance of probe information/data corresponding to probe trajectories that have already and/or previously been selected and added to the set of selected probe trajectories. In an example embodiment, the familiarity score corresponding to the particular instance of probe information/data may provide a measure of the spatial similarity between the particular instance of probe information/data and a most similar instance of probe information/data corresponding to a probe trajectory that has already and/or previously been selected and added to the set of selected probe trajectories.

In various embodiments a familiarity score is generated and/or determined for each instance of probe information/data of a probe trajectory being considered to determine whether or not the probe trajectory will be selected and added to the set of selected probe trajectories. In various embodiments, a least familiar familiarity score for the probe trajectory may be identified. For example, the least familiar familiarity score is the familiarity score generated and/or determined for the instances of probe information/data of the probe trajectory that indicates that the corresponding instance of probe information/data is the least spatially similar to the instances of probe information/data of the selected probe trajectories that have already and/or previously been added to the set of selected probe trajectories. For example, in an example embodiment, wherein a smaller familiarity score indicates less spatial similarity between the instance of probe information/data and the instances of probe information/data of the already and/or previously selected probe trajectories, the smallest familiarity score corresponding to an instance of probe information/data of the probe trajectory is identified as the least familiar familiarity score for the probe trajectory. In an example embodiment wherein a larger familiarity score indicates less spatial similarity between the instance of probe information/data and the instances of probe information/data of the already and/or previously selected probe trajectories, the largest familiarity score corresponding to an instance of probe information/data of the probe trajectory is identified as the least familiar familiarity score for the probe trajectory. In an example embodiment, when a probe trajectory is selected, the selected probe trajectory is then added to the set of selected probe trajectories.

In an example embodiment, if the least familiar familiarity score corresponding to a probe trajectory satisfies a familiarity threshold requirement, the probe trajectory is selected and added to the set of selected probe trajectories. If the least familiar familiarity score corresponding to the probe trajectory does not satisfy the familiarity threshold requirement, the probe trajectory is not selected and is not added to the set of selected probe trajectories. For example, when the least familiar familiarity score indicates that an instance of probe information/data of the probe trajectory is less familiar than a familiarity score threshold, the probe least familiar familiarity score satisfies the familiarity threshold requirement and, when the least familiar familiarity score indicates that an instance of probe information/data of the probe trajectory is not less familiar than the familiarity score threshold, the probe trajectory does not satisfy the familiarity threshold requirement.

In another example embodiment, a selection probability is assigned to a probe trajectory based on the least familiar familiarity score of the probe trajectory. For example, the less spatially similar an instance of probe information/data is in relation to the instances of probe information/data of the already and/or previously selected probe trajectories, the higher the selection probability assigned to the probe trajectory. A determination of whether or not the probe trajectory is selected or not may then be performed based on the selection probability. For example, a weighted random determination may be used to determine whether or not the probe trajectory is selected based on the selection probability assigned to the probe trajectory based on the least familiar familiarity score corresponding to the probe trajectory.

At block 308, the selected probe trajectories are map-matched. For example, the analysis apparatus 10 may map-match the selected probe trajectories. For example, the analysis apparatus 10 may comprise means, such as processor 12, memory 14, and/or the like, for map-matching the selected probe trajectories. For example, each instance of probe information/data of a selected probe trajectory (e.g., a probe trajectory of the set of selected probe trajectories) may be map-matched to a TME of a digital map that represents the road network. For example, the location information/data of an instance of probe information/data of a selected probe trajectory and map information/data of the digital map may be used to identify a TME of the digital map corresponding to the travel lane and/or road segment the probe apparatus 20 was traveling along when the instance of probe information/data was generated. In an example embodiment, the selected probe trajectory is segmented into probe trajectory segments, wherein each probe trajectory segment includes the instances of probe information/data of the probe trajectory that were map-matched to the same TME. For example, a first probe trajectory segment includes the instances of probe information/data of the probe trajectory that were map-matched to a first TME.

At block 310, the map-matched probe trajectories are analyzed to determine traffic and/or map information/data. For example, the analysis apparatus 10 may analyze the map-matched probe trajectories to determine traffic and/or map information/data. For example, the analysis apparatus 10 may comprise means, such as processor 12, memory 14, and/or the like, for analyzing the map-matched probe trajectories to determine traffic and/or map information/data. For example, the probe trajectory segments may be binned and/or grouped based on the corresponding map-matched TME, and then each bin and/or group of probe trajectory segments may be analyzed to generate and/or determine traffic and/or map information/data for the corresponding TME. In various embodiments, the traffic and/or map information/data may correspond to and/or include TME geometry corresponding to the TME, driving conditions along the TME, time dependent and/or time independent attributes of the TME (e.g., speed limit, a representative speed, current travel speed, free flow ratio, incident indicator/information, traffic volume, and/or the like), and/or other traffic and/or map information/data.

In various embodiments, the set of selected probe trajectories includes M<N probe trajectories (where N is the number of the probe trajectories of the plurality of probe trajectories from which the selected probe trajectories are selected). The sampling of the M selected probe trajectories from the N probe trajectories reduces the effective traversal counts determined based on M selected probe trajectories. In various embodiments, the reduction of the effective travel counts is corrected using a correction factor. For example, determining a volume of traffic along a TME based on the set of selected probe trajectories may include the application of a correction factor. For example, the traffic volume and/or number of traversals along a TME may be determined based on the map-matched probe trajectory segments generated and/or determined by map-matching the probe trajectories of the set of selected probe trajectories. An estimation of the traffic volume and/or number of traversals along a TME for all of the plurality of instances of probe information/data and/or plurality of probe trajectories may then be determined by multiplying a correction factor with the traffic volume and/or number of traversals along the TME determined based on the map-matched probe trajectory segments corresponding to the set of selected probe trajectories. In various embodiments, the correction factor cf is determined by cf=p(x, $X_{all}$)/p(x, $X_{selected}$), where p(x, $X_{all}$) is the density function of all of the plurality of instances of probe information/data at location x and p(x, $X_{selected}$) is the density function of the instances of probe information/data of the selected probe trajectories of the set of selected probe trajectories at location x. In various embodiments, $$p(x, X_{all}) = \frac{1}{n_{all}h}\sum\nolimits_{x_j \in X_{all}} K((x-x_j)/h) \text{ and}$$

$$p(x, X_{selected}) = \frac{1}{n_{selected}h}\sum\nolimits_{x_j \in X_{selected}} K((x-x_j)/h),$$

where $n_{all}$ is the number of instances of probe information/data in $X_{all}$, the plurality of instances of probe information/data, $n_{selected}$ is the number of instances of probe information/data in $X_{selected}$, the instances of probe information/data of the set of selected probe trajectories, h is a tunable bandwidth parameter, and K is the kernel function. In various embodiments, a variety of kernel functions may be used. In an example embodiment, the kernel function is a Gaussian kernel, where $$K(u) = (2\pi)^{-1/2} e^{-\frac{u^2}{2}}.$$

In an example embodiment, as described above, the kernel may be a binned kernel density estimator. For example, the spatial density information/data of $X_{all}$ and the spatial density information/data of $X_{selected}$ may each be encoded in a grid data structure. Thus, the determination of volume related traffic and/or map information/data corresponding to a TME may include the application of a correction factor based on ratio of the density of instances of probe information/data of the plurality of instances of probe information/data for grid points in the vicinity of the TME to the density of instances of probe information/data of the probe trajectories of the set of selected probe trajectories for grid points in the vicinity of the TME.

At block 312, the traffic and/or map information/data is provided. For example, the analysis apparatus 10 may provide the traffic and/or map information/data such that one or more consumer apparatus 30 receives the traffic and/or map information/data. For example, the analysis apparatus 10 may comprise means, such as processor 12, memory 14, communication interface 16, and/or the like, for providing the traffic and/or map information/data such that one or more consumer apparatus 30 receives the traffic and/or map information/data. In various embodiments, the traffic and/or map information/data corresponding to a TME may be provided by itself, packaged with traffic and/or map information/data corresponding to other TMEs, and/or packaged as a layer, for example, of a digital map and/or a digital map tile (e.g., a pre-defined portion of the digital map that represents a portion of the road network that corresponds to the TME to which the traffic and/or map information/data corresponds). As indicated above, the analysis apparatus 10 may provide the traffic and/or map information/data (possibly as part of a digital map and/or digital map tile) such that one or more consumer apparatus 30 receive the traffic and/or map information/data such that at least one of the one or more consumer apparatuses may use the traffic and/or map information/data for performing one or more navigation functions.

In various embodiments, a consumer apparatus 30 receives the traffic and/or map information/data. In an example embodiment, the vehicle apparatus 30 is onboard a vehicle 5. In an example embodiment, the consumer apparatus 30 receives traffic and/or map information/data as part of a geographic database, digital map, tile of a digital map, and/or the like. In various embodiments, the consumer apparatus 30 may store the traffic and/or map information/data (e.g., as part of the geographic database, digital map, and/or one or more tiles of the digital map) in memory 34. The consumer apparatus 30 may then access at least a portion of the traffic and/or map information/data for use in performing one or more navigation functions. For example, a consumer apparatus 30 may comprise means, such as processor 32, memory 34, communication interface 36, user interface 38, sensors 39, and/or the like for receiving traffic and/or map information/data, storing traffic and/or map information/data, accessing traffic and/or map information/data, and/or using traffic and/or map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like.

b. Generating a Set of Selected Probe Trajectories

In various embodiments, a set of selected probe trajectories is defined, generated, and/or determined by an analysis apparatus 10. For example, a plurality of probe trajectories may be defined based on a plurality of instances of probe information/data. In various embodiments, the plurality of probe trajectories consists of N probe trajectories. A portion of the plurality of probe trajectories are selected and added to a set of selected probe trajectories based on a familiarity model. In various embodiments, a familiarity score is determined for each instance of probe information/data of each probe trajectory and the least familiar familiarity score of a particular probe trajectory to determine if the particular probe trajectory is to be selected. The set of selected probe trajectories may then be map-matched and used to determine traffic and/or map information/data.

FIG. 4 provides a flowchart illustrating operations performed, such as by the analysis apparatus 10 of FIG. 2A to define, generate, and/or determine the set of selected probe trajectories from a plurality of probe trajectories based on a familiarity model. For example, FIG. 4 provides a flowchart for how, in an example embodiment, the set of selected probe trajectories is defined, generated and/or determined at block 306. Starting at block 402, an empty set of selected probe trajectories is initiated. For example, the analysis apparatus 10 may initiate an empty set of selected probe trajectories. For example, the analysis apparatus 10 may comprise means, such as processor 12, memory 14, and/or the like for initiating an empty set of selected probe trajectories.

At block 404, an initial probe trajectory is added to the set of selected probe trajectories. For example, the analysis apparatus 10 may add an initial probe trajectory to the set of selected probe trajectories. For example, the analysis apparatus 10 may comprise means, such as processor 12, memory 14, and/or the like for adding an initial probe trajectory to the set of selected probe trajectories. For example, the analysis apparatus 10 may consider an initial probe trajectory for selection. As the set of selected probe trajectories is empty at the time the initial probe trajectory is considered, the familiarity score of each of the instances of probe information/data of the initial probe trajectory is undefined and considered unfamiliar.

At block 406, a familiarity and/or spatial coverage model is generated based on the initial probe trajectory. For example, the analysis apparatus 10 may generate a familiarity and/or spatial coverage model based on the initial probe trajectory. For example, the analysis apparatus 10 may comprise means, such as processor 12, memory 14, and/or the like for generating a familiarity and/or spatial coverage model. For example, the familiarity and/or spatial coverage model may be a model that describes the spatial distribution of the instances of probe information/data of the selected probe trajectories of the set of selected probe trajectories. In an example embodiment, the familiarity and/or spatial coverage model is a tree data structure (e.g., a K-D tree). For example, generating the familiarity and/or spatial coverage model may include generating a K-D tree corresponding to the location information/data of the instances of probe information/data of the initial probe trajectory. In an example embodiment, the familiarity and/or spatial coverage model is a grid model. For example, the location information/data of each instance of probe information/data of the initial probe trajectory may be binned based on its proximity to a grid point. For example, a linear binning approximation may be used for kernel density estimation such that the familiarity and/or spatial coverage model is provided as a fixed-size grid having a weight value associated with every grid point, where the weight is inversely proportional to how close (e.g., Euclidean distance) the location corresponding to the location information/data of one or more instances of probe information/data of the initial probe trajectory is to that grid point. The weight associated with each grid point may indicate how familiar that grid point is based on the probe trajectories of the set of selected probe trajectories.

Once the familiarity and/or spatial coverage model is generated, the remaining probe trajectories of the plurality of probe trajectories are each considered in turn. For example, the plurality of probe trajectories may be index by an index i. For example, the initial probe trajectory may be the i=0 probe trajectory. For example, the familiarity and/or spatial coverage model is generated based on the initial probe trajectory, and then the i=1 probe trajectory may be considered.

At block 408, the familiarity score for each instance of probe information/data of the ith probe trajectory are determined based on the familiarity and/or spatial coverage model. For example, the analysis apparatus 10 may determine the familiarity scores for the instances of probe information/data the ith probe trajectory. For example, the analysis apparatus 10 may comprise means, such as processor 12, memory 14, and/or the like, for determining the familiarity scores of the instances of probe information/data of the ith probe trajectory. For example, the location information/data and/or the location indicated by the location information/data of an instance of probe information/data may be considered in light of the familiarity and/or spatial coverage model to determine a familiarity score the instance of probe information/data.

In various embodiments, the familiarity and/or spatial coverage model is a spatially smooth function. In an example embodiment, the familiarity and/or spatial coverage is tolerant of slight positioning noise and arbitrary time intervals. In various embodiments, the spatial segmentation of the familiarity and/or spatial coverage model is learned from the distribution of the plurality of instances of probe information/data and/or from the instances of probe information/data of the set of selected probe trajectories. In various embodiments, the kernel density estimation (KDE) is used to determine the familiarity score for an instance of probe information/data. In general KDE is a non-parametric way to estimate the probability density function of a random variable. The purpose of KDE is to provide a continuous function that can describe how likely a point is to fall in a general area. The likelihood that a point is to fall in a general area is typically parameterized by a bandwidth parameter that affects the spatial sensitivity of the KDE. A low bandwidth means that close points have a large effect on the resulting estimation, while points further away have less of an effect on the estimate. A high bandwidth reduces the effect of close points and increases the contribution of more distant points when determining the estimation, acting as a spatial smoothing mechanism. Let $X_{selected}$ be the set of instances of probe information/data of each of the selected probe trajectories and let $x_j$ be the location indicated by the location of information/data of the jth instance of probe information/data in the set of selected probe trajectories $X_{selected}$. The density function of the set of selected probe trajectories $p(x, X_{selected})$ may be written as $$p(x, X_{selected}) = \frac{1}{nh}\sum_{x_j \in X_{selected}} K((x - x_j)/h),$$

where n is the number of instances of probe information/data in $X_{selected}$, h is a tunable bandwidth parameter, and K is the kernel function. In various embodiments, a variety of kernel functions may be used. In an example embodiment, the kernel function is a Gaussian kernel, where $$K(u) = (2\pi)^{-1/2} e^{-\frac{u^2}{2}}.$$

In an example embodiment, the familiarity score fs for an instance of probe information/data t having location information/data indicating location x, given a set of selected probe trajectories $X_{selected}$, is determined as $$fs(x, X_{selected}) = \frac{1}{h}\sum_{x_j \in X_{selected}} K((x - x_j)/h).$$

In an example embodiment, as described above, the kernel may be a binned kernel density estimator. For example, the familiarity and/or spatial coverage model may be a grid. In such an embodiment, the sum is over all of the grid points and/or all of the grid points within a distance threshold of the location x.

At block 410, the least familiar familiarity score for the ith probe trajectory is identified. For example, the analysis apparatus 10 may identify the least familiar familiarity score for the ith probe trajectory. For example, the analysis apparatus 10 may comprise means, such as processor 12, memory 14, and/or the like, for identifying the least familiar familiarity score for the ith probe trajectory. For example, the least familiar familiarity score for the ith probe trajectory is identified from the familiarity scores for the instances of probe information/data of the ith probe trajectory. In an example embodiment, where the familiarity score for an instance of probe information/data t having location information/data indicating location x is determined as $$fs(x, X_{selected}) = \frac{1}{h}\sum_{x_j \in X_{selected}} K((x - x_j)/h),$$

the least familiar familiarity score for the ith probe trajectory is the smallest familiarity score for the instances of probe information/data of the ith probe trajectory. For example, if $t_{ik}$ are the instances of probe information/data of the ith probe trajectory Ti and each instances of probe information/data $t_{ik}$ includes location information/data indicating location $x_{ik}$, the least familiar familiarity score for the ith probe trajectory is $\min(fs(x_{ik}, X_{selected}))$.

At block 412, it is determined whether the ith probe trajectory is to be selected or not based on the least familiar familiarity score for the ith probe trajectory. For example, the analysis apparatus 10 may determine whether the ith probe trajectory is to be selected or not based on the least familiar familiarity score for the ith probe trajectory. For example, the analysis apparatus 10 may comprise means, such as processor 12, memory 14, and/or the like, for determining whether the ith probe trajectory is to be selected or not based on the least familiar familiarity score the ith probe trajectory.

In an example embodiment, if the least familiar familiarity score corresponding to the ith probe trajectory satisfies a familiarity threshold requirement, it is determined that the ith probe trajectory is to be selected. If the least familiar familiarity score corresponding to the ith probe trajectory does not satisfy the familiarity threshold requirement, it is determined to not select the ith probe trajectory. For example, when the least familiar familiarity score indicates that an instance of probe information/data of the ith probe trajectory is less familiar than a familiarity score threshold, the least familiar familiarity score satisfies the familiarity threshold requirement and it is determined that the ith probe trajectory is to be selected. When the least familiar familiarity score indicates that an instance of probe information/data of the ith probe trajectory is not less familiar than the familiarity score threshold, the probe trajectory does not satisfy the familiarity threshold requirement and the ith probe trajectory is not selected. In an example embodiment, the familiarity score threshold is defined so as to provide traffic and/or map information/data having a desired and/or application appropriate coverage of TMEs of the portion of the road network.

In another example embodiment, a selection probability is assigned to the ith probe trajectory based on the least familiar familiarity score of the ith probe trajectory. For example, the less spatially similar an instance of probe information/data is in relation to the instances of probe information/data of the already and/or previously selected probe trajectories (e.g., based on the familiarity and/or spatial coverage model), the higher the selection probability assigned to the ith probe trajectory. A determination of whether or not the ith probe trajectory is selected or not may then be performed based on the selection probability. For example, a weighted random determination may be used to determine whether or not the ith probe trajectory is selected based on the selection probability assigned to the ith probe trajectory based on the least familiar familiarity score corresponding to the ith probe trajectory. In an example embodiment, the selection probabilities may be assigned so as to provide traffic and/or map information/data having a desired and/or application appropriate coverage of TMEs of the portion of the road network.

When, at block 412, it is determined that the ith probe trajectory is to be selected, the process continues to block 414. At block 414, the ith probe trajectory is added to the set of selected probe trajectories and the familiarity and/or spatial coverage model is updated based on the ith probe trajectory (e.g., based on the two or more instances of probe information/data of the ith probe trajectory). For example, the analysis apparatus 10 may add the ith probe trajectory to the set of selected probe trajectories and update the familiarity and/or spatial coverage model based on the ith probe trajectory. For example, the analysis apparatus 10 may comprise means, such as processor 12, memory 14, and/or the like, for adding the ith probe trajectory to the set of selected probe trajectories and updating the familiarity and/or spatial coverage model based on the ith probe trajectory. For example, the familiarity and/or spatial coverage model may be updated based on the two or more instances of probe information/data of the ith probe trajectory.

When at block 412, it is determined that the ith probe trajectory is not to be selected, the process continues to block 416. At block 416, the index i is iterated. For example, the analysis apparatus 10 may iterate the index i. For example, the analysis apparatus 10 may comprise means, such as processor 12, memory 14, and/or the like, for iterating the index i. For example, iterating the index i may include increasing the value of the index i by 1.

At block 418, it is determined whether the value of the index i is less than N, where N is the number of probe trajectories in the plurality of probe trajectories. In various embodiments, the plurality of probe trajectories includes N probe trajectories. For example, the analysis apparatus 10 may determine if the value of the index i is less than N. For example, the analysis apparatus 10 may comprise means, such as the processor 12, memory 14, and/or the like, for determining if the value of the index i is less than N. For example, if the value of the index i is less than N, the process continues to block 408 and the i+1 probe trajectory is considered. For example, if the value of the index i=N or is greater than N, the set of selected probe trajectories is provided, at block 420. For example, the analysis apparatus 10 may provide the set of selected probe trajectories. For example, the analysis apparatus 10 may comprise means, such as processor 12, memory 14, and/or the like, for providing the set of selected probe trajectories. For example, the set of selected probe trajectories may be provided to a map-matching engine, and/or the like. For example, the set of selected probe trajectories may be map-matched and used to generate and/or determine traffic and/or map information/data.

Technical Advantages

Various embodiments provide a technical solution to the technical problem of reducing the computational expense of generating and/or determining traffic and/or map information/data by processing probe information/data. Various embodiments, provide a technical solution to the technical problem of reducing the computational expense of generating and/or determining traffic and/or map information/data that have an application appropriate coverage of the corresponding portion of the road network. For example, FIG. 5A provides a plot illustrating example simulation results indicating the number of TMEs to which selected probe trajectories are map-matched as a function of the number of observed probe trajectories for three different selection processes, in accordance with an example embodiment. The three different selection processes include selecting all of the plurality of probe trajectories (shown as a solid line), a uniform selection of probe trajectories where each probe trajectory has a uniform likelihood of being selected (shown as a dashed line), and a familiarity based selection of probe trajectories (shown as a dotted line) in accordance with an example embodiment of the present invention. As shown in FIG. 5A, while the uniform selection of probe trajectories shows a nearly straight line (number of matched TMEs grows with number of map-matched probe trajectories), the familiarity-based sampling becomes flatter and flatter: the more trajectories are observed, the more they can be rejected (e.g., not selected for map-matching). FIG. 5B provides a plot illustrating example simulation results indicating the number of unique TMEs to which selected probe trajectories are map-matched as a function of the number of observed probe trajectories for the three different selection processes, in accordance with an example embodiment. FIG. 5B shows the how the coverage (number of unique TMEs that were map-matched to) grows over time. FIG. 5C provides a plot illustrating example simulation results indicating the number of unique TMEs to which selected probe trajectories are map-matched as a function of the number of map-matched probe trajectories for three different selection processes, in accordance with an example embodiment. FIG. 5C illustrates that nearly complete coverage may be achieved while only processing approximately half of the trajectories, in an example configuration. FIG. 6 provides a plot illustrating example simulation results of the coverage loss c as a function of the sampling rate $\alpha$ for two different selection processes, in accordance with an example embodiment. In particular, FIG. 6 shows the operational curve from several simulation having different familiarity thresholds. The x axis shows the sampling rate $\alpha$, which is the proportion of probe trajectories that gets fully processed (which is proportional to the computational cost of generating and/or determining the traffic and/or map information/data based on processing of the probe information/data). For example, with a 1% relative coverage loss compared to using the full dataset (e.g., all N of the probe trajectories), a 60% sampling rate may be used. Similarly, to generate and/or determine traffic and/or map information/data with a 3% coverage loss, 40% of the probe trajectories may be analyzed. Comparing to a simple uniform sampling method, for any given sampling rate, the familiarity-based sampling achieves roughly one half of the coverage loss compared to uniform sampling. In an example embodiment, the sampling rate is at least 28%, FIG. 7 provides a plot illustrating the number of traversals, on a log scale, along each TME to which one or more probe trajectories was map-matched for the three different selection processes, in accordance with an example embodiment. FIG. 7 shows that while the uniform sampling has relatively higher traversal counts of more frequently visited TMEs, the tail of the distribution is much lower, dropping to zero much faster, while familiarity sampling in accordance with the present invention pulls up those infrequently-traversed TMEs. This provides for the generation and/or determination of traffic and/or map information/data of TMEs that are only lightly traveled and/or for which only a relatively small amount of probe information/data is available.

Additionally, various embodiments provide a technical improvement to the increasing the resiliency of the traffic and/or map information/data determined by the processing of the probe information/data against deanonymization attacks. For example, the selected probe trajectories are a subset of the original probe trajectories. Every selected probe trajectory has an associated weight, corresponding to how many probe trajectories it "displaced" due to the familiarity sampling (e.g., the selection of probe trajectories based on familiarity score). On less frequently traversed TMEs, the sampling rate is higher than on more frequently traversed ones. For example, a higher percentage of the selected probe trajectories correspond to less frequently traveled TMEs compared to a uniform selection process. Moreover, as more data is collected, the sampling rate decreases across the observed portion of the road network. When observing trajectories to a given destination that has already been travelled to from multiple locations, it's more likely that the next accepted trajectory will be from a new location compared to any of the previously observed ones as the familiarity score of the new location will indicate the new location is less familiar than the previously observed locations. Moreover, when a probe trajectory from an origin to a destination is selected, a reverse trip (from destination to origin) becomes less likely to be subsequently selected. Furthermore, the weight of a probe trajectory can be used to approximate the frequency with which the destination has been visited, preserving the origin/destination count property of the source dataset (the plurality of instances of probe information/data). For example, tracking attacks are attacks that track a known user across multiple trips based on an initial time and place for the known user. Example embodiments of the present invention are resilient against tracking attacks because even if the initial location is known, the probe trajectory corresponding to the known user will not necessarily be included in the set of selected probe trajectories and the subsequent trips from the same known user are less likely to be selected. Mobility pattern inference attacks use probe trajectories to infer recurrent origin-destination pairs that could feasibly linked to an individual user's commutes, potentially de-anonymizing the individual user via mobility patterns. In various embodiments, the selection of probe trajectories based on familiarity score would mask a large majority of later trips along a same route as the later trips would be spatially similar to trips that are already accounted for in the set of selected probe trajectories. In particular, in various embodiments of the present invention, it's unlikely that repeated trajectories between the same locations will be selected. Cross-trip linking includes the linking of trips based on a destination of one trip being the origin of the next trip for a probe apparatus. This linking provides an attacker with three locations (e.g., original origin, first destination, second destination) which drastically decreases the set of possible identities of the individual user associated with the probe apparatus. However, in various embodiments, selection of probe trajectories based on a familiarity score would mask a large majority of later trajectories, which reduces the ability to cross-link trips. For example, in various embodiments of the present invention, it's unlikely that repeated trajectories between the same locations will be selected, even if the second trip is the reverse of the first trip. Location type and semantics inference attacks use mobility patterns and cartographic data to infer the type of a location (e.g., home, work, medical, leisure, commercial, and/or the like). However, various embodiments are unlikely to select recurring probe trajectories by the same individual user, thereby reducing the ability of an attacker to make inferences based on mobility patterns of individual users.

Thus, various embodiments provide technical improvements to the art. For example, the selection process provides an application specific appropriate level of coverage of the road network by the generated and/or determined traffic and/or map information/data while reducing the computational resources required for generating and/or determining the traffic and/or map information/data and increasing the resiliency of the traffic and/or map information/data to deanonymization attacks.

III. Example Apparatus

The analysis apparatus 10, probe apparatus 20, and/or consumer apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the analysis apparatus 10, probe apparatus 20, and/or consumer apparatus 30 may be embodied in other types of computing devices, such as a server, a personal computer, a computer workstation, a laptop computer, a plurality of networked computing devices or the like, that are configured to update one or more map tiles, analyze probe information/data for route planning or other purposes, generate, determine, store, and/or provide traffic and/or map information/data (e.g., including driving condition information/data, in an example embodiment), and/or the like. In an example embodiment, a probe apparatus 20 and/or consumer apparatus 30 is an in-vehicle navigation system onboard a vehicle 5 or a mobile device and an analysis apparatus 10 is a server. In an example embodiment, a probe apparatus 20 is an apparatus configured to capture sensor information/data via one or more sensors onboard the corresponding vehicle 5. In this regard, FIG. 2A depicts an example analysis apparatus 10, FIG. 2B depicts an example probe apparatus 20, and FIG. 2C depicts an example consumer apparatus 30 that may be embodied by various computing devices including those identified above. As shown, the analysis apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, a consumer apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the analysis apparatus 10, probe apparatus 20, and/or consumer apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the analysis apparatus 10, probe apparatus 20, and/or consumer apparatus 30 may include a user interface 18, 28, 38 that may, in turn, be in communication with the processor 12, 22, 32 to provide output to the user, such as one or more routes through a road network, a notification that a vehicle is approaching a human operator assistance portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The analysis apparatus 10, probe apparatus 20, and/or consumer apparatus 30 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the analysis apparatus 10, probe apparatus 20, and/or consumer apparatus 30 of an example embodiment, a navigation system may also include or have access to a geographic database. For example, in various embodiments, an analysis apparatus 10, probe apparatus 20, and/or consumer apparatus 30 may comprise a component (e.g., memory 14, 24, 34, and/or another component) that stores a digital map (e.g., in the form of a geographic database) comprising a first plurality of data records, each of the first plurality of data records representing a corresponding traversable map element, wherein at least some of said first plurality of data records include traffic and/or map information/data corresponding to the TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, link, or TME data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, TME data records, POI data records, and/or other data records. In an example embodiment, the analysis apparatus 10 may be configured to modify, update, and/or the like one or more data records of the geographic database. For example, the analysis apparatus 10 may modify, update, generate, and/or the like traffic and/or map information/data corresponding to TMEs, links, lanes, road segments, travel lanes of road segments, nodes, intersection, and/or the like and/or the corresponding data records (e.g., to add or update a corresponding sensor quality index table), a localization layer (e.g., comprising localization features) and/or the corresponding data records, and/or the like.

In an example embodiment, the TME data records are links, lanes, or segments (e.g., maneuvers of a maneuver graph) representing roads, travel lanes of roads, streets, or paths, as can be used in the calculated route or recorded route information for determination of one or more personalized routes. The intersection data records are end points corresponding to the respective links, segments, or TMEs of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an analysis apparatus 10, probe apparatus 20, and/or consumer apparatus 30 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of an analysis apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by an analysis apparatus, a plurality of instances of probe data, each instance of probe data comprising location data indicating a location of a probe apparatus when the instance of probe data was generated and a timestamp indicating a date and/or time when the instance of probe data was generated, wherein the analysis apparatus comprises a processor, memory, and a communication interface;
   generating, by the analysis apparatus, a plurality of probe trajectories from the plurality of instances of probe data, wherein a probe trajectory of the plurality of probe trajectories is generated by linking two or more instances of probe data corresponding to a same trip and time ordering the two or more instances of probe data based on the timestamp of each of the two or more instances of probe data, wherein the plurality of probe trajectories comprises a first number of probe trajectories;
   defining, by the analysis apparatus, a set of selected probe trajectories, wherein the set of selected probe trajectories comprises a second number of probe trajectories, the second number of probe trajectories being less than the first number of probe trajectories, and wherein defining the set of selected probe trajectories comprises:
      determining a least familiar familiarity score for a first probe trajectory of the plurality of probe trajectories based on a familiarity model that (a) represents a spatial coverage of instances of probe data of selected probe trajectories of the set of selected probe trajectories and (b) is a tree data structure, wherein the least familiar familiarity score is a familiarity score corresponding to a respective instance of probe data of the first probe trajectory that, based on the familiarity model, is determined to be a least spatially familiar instance of probe data of the first probe trajectory,
      determining whether to select the first probe trajectory based on the least familiar familiarity score for the first probe trajectory, and
      when it is determined to select the first probe trajectory, adding the first probe trajectory to the set of selected probe trajectories;
   generating, by the analysis apparatus, traffic and/or map data based on the set of selected probe trajectories; and providing, by the analysis apparatus, the traffic and/or map data such that a consumer apparatus receives the traffic and/or map data.

2. The method of claim 1, wherein the consumer apparatus is configured to use at least a portion of the traffic and/or map data to perform a navigation function.

3. The method of claim 1, wherein the traffic and/or map data is provided as part of a digital map or a tile of a digital map.

4. The method of claim 1, wherein the traffic and/or map data is generated by map-matching the selected probe trajectories of the set of selected probe trajectories.

5. The method of claim 1, wherein the traffic and/or map data comprises volume related traffic and/or map data which is determined by applying a correction factor that is determined based on a ratio of a density function of the plurality of instances of probe data to a density function of the instances of probe data of the selected probe trajectories of the set of selected probe trajectories.

6. The method of claim 1, wherein determining the least familiar familiarity score for the first probe trajectory comprises:
  determining two or more familiarity scores, wherein each familiarity score of the two or more familiarity scores corresponds to an instance of probe data of the two or more instances of probe data linked to form the first probe trajectory; and
  identifying the least familiar familiarity score from the two or more familiarity scores.

7. The method of claim 1, wherein, when it is determined to select the first probe trajectory, the familiarity model is updated based on instances of probe data of the first probe trajectory.

8. The method of claim 1, wherein determining whether to select the first probe trajectory based on the least familiar familiarity score for the first probe trajectory comprises determining whether the least familiar familiarity score satisfies a familiarity threshold requirement.

9. The method of claim 8, wherein the familiarity threshold requirement is defined such that the traffic and/or map data has an application appropriate coverage of a corresponding road network.

10. The method of claim 1, wherein determining whether to select the first probe trajectory based on the least familiar familiarity score for the first probe trajectory comprises assigning a selection probability to the first probe trajectory and determining whether to select the first probe trajectory based on the selection probability.

11. The method of claim 10, wherein the selection probability is assigned such that the traffic and/or map data has an application appropriate coverage of a corresponding road network.

12. The method of claim 1, wherein the tree data structure is a K-D tree.

13. The method of claim 1, wherein the familiarity model is updated iteratively as part of defining the set of selected probe trajectories, and updating the familiarity model and defining the set of selected probe trajectories comprises iterating (a) determining a familiarity score for at least one probe trajectory of the plurality of probe trajectories based on a previous iteration of the familiarity model, (b) determining whether to select the at least one probe trajectory based on the determined familiarity score, and (c) updating the familiarity model based at least in part on the determination of whether to select the at least one probe trajectory.

14. An apparatus comprising at least one processor, a communications interface configured for communicating via at least one network, and at least one memory storing computer program code, the at least one memory and the computer program code configured to, with the processor, cause the apparatus to at least:
  receive a plurality of instances of probe data, each instance of probe data comprising location data indicating a location of a probe apparatus when the instance of probe data was generated and a timestamp indicating a date and/or time when the instance of probe data was generated;
  generate a plurality of probe trajectories from the plurality of instances of probe data, wherein a probe trajectory of the plurality of probe trajectories is generated by linking two or more instances of probe data corresponding to a same trip based on the timestamp of each of the two or more instances of probe data, wherein the plurality of probe trajectories comprises a first number of probe trajectories;
  define a set of selected probe trajectories, wherein the set of selected probe trajectories comprises a second number of probe trajectories, the second number of probe trajectories being less than the first number of probe trajectories, and wherein defining the set of selected probe trajectories comprises:
    determining a least familiar familiarity score for a first probe trajectory of the plurality of probe trajectories based on a familiarity model that (a) represents a spatial coverage of instances of probe data of selected probe trajectories of the set of selected probe trajectories and (b) is a tree data structure, wherein the least familiar familiarity score is a familiarity score corresponding to a respective instance of probe data of the first probe trajectory that, based on the familiarity model, is determined to be a least spatially familiar instance of probe data of the first probe trajectory,
    determining whether to select the first probe trajectory based on the least familiar familiarity score for the first probe trajectory, and
    when it is determined to select the first probe trajectory, adding the first probe trajectory to the set of selected probe trajectories;
  generate traffic and/or map data based on the set of selected probe trajectories; and
  provide the traffic and/or map data such that a consumer apparatus receives the traffic and/or map data.

15. The apparatus of claim 14, wherein the traffic and/or map data is generated by map-matching the selected probe trajectories of the set of selected probe trajectories and determining traffic and/or map data for a traversable map element (TME) based on probe trajectory segments map-matched to the TME.

16. The apparatus of claim 14, wherein the traffic and/or map data comprises volume related traffic and/or map data which is determined by applying a correction factor that is determined based on a ratio of a density function of the plurality of instances of probe data to a density function of the instances of probe data of the selected probe trajectories of the set of selected probe trajectories.

17. The apparatus of claim 14, wherein determining the least familiar familiarity score for the first probe trajectory comprises:
  determining two or more familiarity scores, wherein each familiarity score of the two or more familiarity scores corresponds to an instance of probe data of the two or more instances of probe data linked to form the first probe trajectory; and identifying the least familiar familiarity score from the two or more familiarity scores.

18. The apparatus of claim 14, wherein, when it is determined to select the first probe trajectory, the familiarity model is updated based on instances of probe data of the first probe trajectory.

19. The apparatus of claim 14, wherein determining whether to select the first probe trajectory based on the least familiar familiarity score for the first probe trajectory comprises at least one of (a) determining whether the least familiar familiarity score satisfies a familiarity threshold requirement or (b) assigning a selection probability to the first probe trajectory and determining whether to select the first probe trajectory based on the selection probability.

20. A component of an apparatus, the component comprising a non-transitory computer-readable medium storing at least:
 a digital map comprising a first plurality of data records, each of said first plurality of data records representing a corresponding traversable map element (TME),
 wherein at least some of said first plurality of data records comprise:
 traffic and/or map data for the corresponding TME generated by:
  receiving, by an analysis apparatus, a plurality of instances of probe data, each instance of probe data comprising location data indicating a location of a probe apparatus when the instance of probe data was generated and a timestamp indicating a date and/or time when the instance of probe data was generated;
  generating, by the analysis apparatus, a plurality of probe trajectories from the plurality of instances of probe data, wherein a probe trajectory of the plurality of probe trajectories is generated by linking two or more instances of probe data corresponding to a same trip and time ordering the two or more instances of probe data based on the timestamp of each of the two or more instances of probe data, wherein the plurality of probe trajectories comprises a first number of probe trajectories;
  defining, by the analysis apparatus, a set of selected probe trajectories, wherein the set of selected probe trajectories comprises a second number of probe trajectories, the second number of probe trajectories being less than the first number of probe trajectories, and wherein defining the set of selected probe trajectories comprises:
   determining a least familiar familiarity score for a first probe trajectory of the plurality of probe trajectories based on a familiarity model that (a) represents a spatial coverage of instances of probe data of selected probe trajectories of the set of selected probe trajectories and (b) is a tree data structure, wherein the least familiar familiarity score is a familiarity score corresponding to a respective instance of probe data of the first probe trajectory that, based on the familiarity model, is determined to be a least spatially familiar instance of probe data of the first probe trajectory,
   determining whether to select the first probe trajectory based on the least familiar familiarity score for the first probe trajectory, and
   when it is determined to select the first probe trajectory, adding the first probe trajectory to the set of selected probe trajectories;
  map matching one or more probe trajectory segments corresponding to one or more probe trajectories of the set of selected probe trajectories to the corresponding TME; and
  generating, by the analysis apparatus, the traffic and/or map data for the corresponding TME based on the one or more probe trajectory segments map-matched to the corresponding TME.

\* \* \* \* \*